US012635838B2

(12) United States Patent
Ko et al.

(10) Patent No.: US 12,635,838 B2
(45) Date of Patent: May 26, 2026

(54) VACUUM CLEANER WITH FLOW PATH DEFINED IN THE CONTACT PORTION

(71) Applicant: LG ELECTRONICS INC., Seoul (KR)

(72) Inventors: Moo Hyun Ko, Seoul (KR); Nam Il Woo, Seoul (KR); Kyoung Ho Ryou, Seoul (KR); Hae Rim Bak, Seoul (KR); Young Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 18/023,469

(22) PCT Filed: Aug. 20, 2021

(86) PCT No.: PCT/KR2021/011112
§ 371 (c)(1),
(2) Date: Feb. 27, 2023

(87) PCT Pub. No.: WO2022/045680
PCT Pub. Date: Mar. 3, 2022

(65) Prior Publication Data
US 2023/0309768 A1 Oct. 5, 2023

(30) Foreign Application Priority Data

Aug. 27, 2020 (KR) ........................ 10-2020-0108899
Oct. 21, 2020 (KR) ........................ 10-2020-0136976

(51) Int. Cl.
*A47L 9/04* (2006.01)
*A46B 9/00* (2006.01)
(Continued)

(52) U.S. Cl.
CPC ............ *A47L 9/0477* (2013.01); *A46B 9/005* (2013.01); *A46B 9/026* (2013.01); *A46B 13/006* (2013.01);
(Continued)

(58) Field of Classification Search
CPC ..... A47L 9/00; A47L 9/02; A47L 9/04; A47L 9/0461; A47L 9/0466; A47L 9/0477; A46B 9/00; A46B 9/005; A46B 13/006
See application file for complete search history.

(56) References Cited

U.S. PATENT DOCUMENTS

2020/0046183 A1 2/2020 Choi et al.
2020/0060496 A1 2/2020 Dawson et al.

FOREIGN PATENT DOCUMENTS

CN 101557748 A 10/2009
CN 105592764 A 5/2016
(Continued)

OTHER PUBLICATIONS

Extended European Search Report in European Appln. No. 21861977.3, mailed on Aug. 8, 2024, 14 pages.
(Continued)

*Primary Examiner* — C. A. Rivera
(74) *Attorney, Agent, or Firm* — Fish & Richardson P.C.

(57) ABSTRACT

A vacuum cleaner includes: a suction nozzle including a rotating cleaner located in front of a suction port; a cleaning main body provided with a first motor that generates a suction force; and a distance sensor coupled to the suction nozzle. The distance sensor detects a distance from a wall surface located in front of the suction nozzle, and when the distance (distance value) is less than or equal to a reference value, the rotation speed of the first motor is increased. Accordingly, when the suction nozzle touches the wall surface and cannot move forward, the suction force is momentarily increased such that foreign substances such as dust can be effectively sucked in from the edge of the wall surface, and effective use of a battery can be achieved.

20 Claims, 24 Drawing Sheets

(51) Int. Cl.

| | |
|---|---|
| *A46B 9/02* | (2006.01) |
| *A46B 13/00* | (2006.01) |
| *A46B 13/02* | (2006.01) |
| *A47L 5/30* | (2006.01) |
| *A47L 9/24* | (2006.01) |
| *A47L 9/28* | (2006.01) |
| *G01B 11/02* | (2006.01) |

(52) U.S. Cl.
CPC ................ *A46B 13/02* (2013.01); *A47L 5/30* (2013.01); *A47L 9/0411* (2013.01); *A47L 9/242* (2013.01); *A47L 9/2805* (2013.01); *A47L 9/2842* (2013.01); *A47L 9/2847* (2013.01); *G01B 11/026* (2013.01); *A46B 2200/3033* (2013.01)

(56) References Cited

FOREIGN PATENT DOCUMENTS

| | | | |
|---|---|---|---|
| CN | 207444893 | U | 6/2018 |
| JP | H05344943 | A  * | 12/1993 |
| JP | 2007282866 | A  * | 11/2007 |
| JP | 2009-268684 | A | 11/2009 |
| JP | 2019-063354 | A | 4/2019 |
| KR | 20-0419038 | Y1 | 6/2006 |
| KR | 20-2009-0001312 | U | 2/2009 |
| KR | 10-1248733 | B | 3/2013 |
| KR | 101331684 | B1  * | 11/2013 |
| KR | 10-1903238 | B1 | 10/2018 |
| WO | WO 2009/149722 | A1 | 12/2009 |
| WO | WO 2021/043391 | | 3/2021 |

OTHER PUBLICATIONS

International Search Report in International Appln. No. PCT/KR2021/011112, mailed on Nov. 30, 2021, 5 pages (with English translation).

Office Action in Australian Appln. No. 2021334888, mailed on Mar. 19, 2024, 9 pages.

Office Action in Chinese Appln. No. 202180052597.2, mailed on Dec. 4, 2025, 20 pages (with English translation).

Office Action in Korean Appln. No. 10-2020-0136976, mailed on Nov. 11, 2025, 17 pages (with English translation).

* cited by examiner

VACUUM CLEANER WITH FLOW PATH DEFINED IN THE CONTACT PORTION

CROSS-REFERENCE TO RELATED APPLICATIONS

This application is a National Phase under 35 U.S.C. § 371 of International Application No. PCT/KR2021/011112, filed on Aug. 20, 2021, which claims the benefit of and priority to Korean Application No. 10-2020-0136976, filed on Oct. 21, 2020, and Korean Application No. 10-2020-0108899, filed on Aug. 27, 2020. The disclosures of the prior applications are hereby incorporated by reference in their entirety.

TECHNICAL FIELD

The present invention relates to a vacuum cleaner including a suction nozzle having a suction port and a cleaner body generating a suction force at the suction port.

BACKGROUND ART

A vacuum cleaner is a device in which dust is configured to be sucked into the vacuum cleaner by a pressure difference of air.

The vacuum cleaner can be configured to include a cleaner body and a suction nozzle. A motor can be provided inside the cleaner body, and a suction force can be generated while the motor rotates. The suction force generated inside the cleaner body can be delivered to the suction nozzle, and external dust can be sucked into the vacuum cleaner through the suction nozzle.

The vacuum cleaner can be divided into a canister type, an upright type, a handy/stick type, etc., according to a form thereof.

In the canister type cleaner, the cleaner body with a wheel is provided separately from the suction nozzle, and the cleaner body and the suction nozzle are connected through a hose.

The upright type cleaner is configured by coupling both the cleaner body and the suction nozzle to a push stick.

In the handy/stick type cleaner, a handle is provided in the cleaner body, and a user can use the handy/stick type cleaner by gripping a cleaner body part. In the handy type cleaner, the cleaner body and the suction nozzle are located to be relatively close to each other, and in the stick type cleaner, the cleaner body and the suction nozzle are located to be relatively far from each other.

Further, as the vacuum cleaner, there is a robot cleaner, and the robot cleaner is configured to suck the dust while autonomously moving through various sensors.

A means configured to wipe or sweep a floor can be coupled to the suction nozzle of the vacuum cleaner.

In regard to the vacuum cleaner, Korean Patent Registration No. 1248733 (hereinafter, referred to as 'Prior Document 1') discloses a vacuum cleaner including the suction nozzle. A rotating agitator is coupled to the suction nozzle of Prior Document 1, and a brush is coupled to an outer peripheral surface of the agitator. When the agitator rotates, the brush sweeps up foreign substances of a floor surface, and the foreign substances are introduced into a suction port.

As another prior document, Korean Patent Registration No. 1903238 (hereinafter, referred to as 'Prior Document 2') discloses a vacuum cleaner including a rotary cleaning unit. The outer peripheral surface of the rotary cleaning unit of Prior Document 2 can be made of a fabric or felt material, and when the rotary cleaning unit rotates, the foreign substances such as the dust accumulated on the floor surface are caught in the outer peripheral surface of the rotary cleaning unit to be effectively removed.

As such, when the means such as the agitator of Prior Document 1 or the rotary cleaning unit of Prior Document 2 is provided in the vacuum cleaner, the foreign substances of the floor surface can be effectively removed when the suction nozzle moves.

However, when the suction nozzle touches a wall surface and does not move forward, the agitator of Prior Document 1 or the rotary cleaning unit of Prior Document 2 is not in direct contact with foreign substances at an edge of the wall surface, so cleaning may not be effectively achieved.

Specifically, in the case of Prior Documents 2, a bottom of the rotary cleaning unit touches the floor surface, and in this case, since the rotary cleaning unit is located between a space at a wall surface corner portion (a front space of the rotary cleaning unit) and a rear space of the rotary cleaning unit, the foreign substances at the wall surface corner portion may not be normally sucked into the suction port.

In the case of Prior Document 1, the brush is formed only on a part of the outer peripheral surface of the agitator, so the front space of the agitator and the rear space of the agitator are in communication with each other, but the suction force is not concentrated, and as a result, a significant time can be required for sucking all foreign substances.

Meanwhile, as described above, an outer peripheral surface of a rotating cleaning unit of Prior Document 2 may be made of a fabric or felt material such as cotton flannel, and when the rotating cleaning unit is wet with water, the water may be evaporated, and then bristles constituting the rotating cleaning unit may not be restored to an original shape, and bent and deformed. When the rotating cleaning unit is deformed, the rotating cleaning unit may not be normally in close contact with the bottom surface, and as a result, a cleaning capability of the vacuum cleaner may deteriorate.

In addition, when water or foreign substances stained in the rotating cleaning unit is not normally removed, the rotating cleaning unit may be contaminated or bacteria may be proliferated.

DISCLOSURE

Technical Problem

The present disclosure describes a vacuum cleaner having a flow path which allows a suction force formed at a suction port to be concentrically delivered to a specific point of a front space of a rotating cleaner when a suction nozzle including the rotating cleaner which rotates in front of the suction port touches a wall surface and does not advance forward.

The present disclosure describes a vacuum cleaner having a flow path which enables the suction force formed at the suction port to be seamlessly delivered to the front space of the rotating cleaner when the rotating cleaner rotates.

The present disclosure describes a vacuum cleaner in which a direction in which the suction force is applied may be switched in a flow path in which foreign substances may move when the rotating cleaner rotates.

The present disclosure describes a vacuum cleaner in which sensing of a wall surface and the resulting suction force control may be effectively achieved.

The present disclosure describes a vacuum cleaner in which the suction force may be increased at the suction port of the suction nozzle before the suction nozzle touches a front wall surface.

The present disclosure describes a vacuum cleaner capable of preventing water from being absorbed in the rotating cleaner.

The present disclosure describes a vacuum cleaner capable of effectively removing water when the rotating cleaner is stained with the water.

The present disclosure describes a vacuum cleaner capable of preventing bacteria from being proliferated in the rotating cleaner.

Technical Solution

According to one aspect of the present invention, a vacuum cleaner is configured to include a cleaner body and a suction nozzle connected to the cleaner body. The cleaner body and the suction nozzle may be connected through a connection pipe.

The suction nozzle is configured to include a nozzle head unit and a rotating cleaner.

A suction port is provided on the bottom of the nozzle head unit.

The rotating cleaner is rotatably coupled to the nozzle head unit based on a first rotary axis parallel to a left-right direction. The rotating cleaner is located in front of the suction port.

A first motor is provided in the cleaner body. The first motor rotates inside the cleaner body so that a suction force is formed in the suction port.

According to one aspect of the present invention, the rotating cleaner is configured to a core, a fluffy, and a first flow path.

The core is configured in a cylindrical shape having the first rotary axis as a central axis.

The fluffy is configured to include at least one of a brush and a textile. The fluffy is coupled to an outer peripheral surface of the core to contact a bottom surface.

The first flow path crosses the fluffy, and has a concave groove form configured in an inclined direction to the first rotary axis.

The outer peripheral surface of the rotating cleaner is covered with the fluffy except for the first flow path.

The first flow path is configured by one line in the rotating cleaner.

The first flow includes a first boundary surface and a second boundary surface.

The first boundary surface forms a boundary between the first flow path and the fluffy. The first boundary surface is configured in a spiral shape.

The second boundary surface forms the boundary between the first flow path and the fluffy at an opposite side to the first boundary surface. The second boundary surface is configured in the spiral shape.

The second boundary surface is located behind the first boundary surface based on a rotational direction of the rotating cleaner.

On a transverse cross section of the rotating cleaner, the first boundary surface and the second boundary surface are configured to be vertical to the outer peripheral surface of the core.

In some implementations, an interval between an inner end of the first boundary surface and an inner end of the second boundary surface is three times larger and four times smaller than a height of the first boundary surface.

In some implementations, the core has an outer diameter of 35 to 40 mm and a length of 210 to 230 mm.

In some implementations, the first flow path has a width of 15 to 25 mm and a depth of 3 to 7 mm.

The first flow path is configured in the spiral shape, and has the width and the depth which are constant in a longitudinal direction.

In some implementations, an angle between a first normal plane which meets the front end of the first boundary surface on a normal plane of the outer peripheral surface of the rotating cleaner and a second normal plane which meets a rear end of the second boundary surface on a normal plane of the outer peripheral surface of the rotating cleaner is 0 to 45°.

The first boundary surface includes a first front end portion forming the front end and a first rear end portion forming the rear end based on the rotational direction of the rotary cleaner.

The second boundary surface includes a second front end portion forming the front end and a second rear end portion forming the rear end based on the rotational direction of the rotating cleaner.

In some implementations, a reference line connecting the first front end portion and the second rear end portion is configured to be parallel to the first rotary axis.

The nozzle head unit includes a first derivation flow path and a second derivation flow path.

The first derivation flow path forms a space extended in a direction parallel to the first rotary axis at the suction port.

The second derivation flow path forms a space extended in a direction opposite to the first flow path at the suction port.

In some implementations, a rear side of the rotating cleaner is exposed to the suction port, the first derivation flow path, and the second derivation flow path at a region lower than the first rotary axis.

The nozzle head unit is configured to include an upper housing, a lower housing, a first side wall, a second side wall, and an internal wall.

The upper housing includes an upper cover formed in the direction parallel to the first rotary axis and covering the upper side of the rotating cleaner.

The upper housing is located at a lower side of the upper housing, and has the suction port formed at a front end of the center of the left-right direction.

The first side wall shields one side surface of the rotating cleaner, and is coupled to the upper housing and the lower housing.

The second side wall shields a side surface of the first side wall, and is coupled to the upper housing and the lower housing.

The internal wall is formed in the direction parallel to the first rotary axis and contacts the rotating cleaner at a rear thereof. A top of the internal wall is coupled to the bottom of the upper housing, and a bottom edge is configured to be higher than the rotating cleaner.

The bottom of the internal wall may be configured to be lower than the first rotary axis.

A front-end corner of the upper cover may be located in front of the rotary cleaner, and may be parallel to the first rotary axis.

In the first side wall and the second side wall, a front lower corner may be inclined or configured in an inclined curve form.

In some implementations, a second flow path stepped inside is formed on the bottom of an outer surface of the first side wall, and a third flow path stepped inside is formed on the bottom of the outer surface of the second side wall.

In some implementations, the rotating cleaner is configured to include the core, and an outer peripheral surface layer coupled to the outer peripheral surface of the core.

The outer peripheral surface layer is configured to include a fluffy region forming the fluffy, and a first flow path region forming the first flow path.

When the outer peripheral surface layer is unfolded flat, the fluffy region has a parallelogram shape, and the first flow path region is formed along one side of the fluffy region.

According to one aspect of the present invention, the vacuum cleaner is configured to further include a distance sensor.

The distance sensor is coupled to the suction nozzle and configured to sense a distance from a wall surface located in front of the suction nozzle.

In some implementations, a rotational speed of the first motor is configured to increase when a distance value sensed by the distance sensor is equal to or less than a reference value.

The distance sensor may be configured as an optical sensor, and located at an upper side of the center in a left-right direction of the suction nozzle.

The suction nozzle is configured to further include a connection neck and a nozzle neck unit.

The connection neck is configured in a pipe form, and connected to the cleaner body.

The nozzle neck unit is configured in the pipe form and extended backward in the nozzle head unit. The nozzle neck unit is rotatably coupled to the connection neck around a second rotary axis.

The distance sensor may be coupled to the upper side of the nozzle neck unit at a point higher than the top of the nozzle head unit.

In some implementations, a distance from a front end of the suction nozzle up to the distance sensor may be 50 to 70 mm, and the reference value may be 120 to 140 mm.

According to one aspect of the present invention, the vacuum cleaner is configured to include a second motor.

The second motor is coupled to the suction nozzle and rotates the rotating cleaner.

In some implementations, a rotational speed of the second motor may be configured to increase when a distance value sensed by the distance sensor is equal to or less than a reference value.

According to one aspect of the present invention, the fluffy may be configured by a combination of fibers having have waterproofness, water-repellency, or antimicrobiality. The fiber constituting the fluffy may be configured in a form of a bristle.

The fluffy may be configured in a form such as a brush.

In some implementations, the fiber constituting the fluffy may be configured to be coated with a water-repellent agent or a waterproof agent.

In some implementations, the fluffy may be made of a polyamide fiber, a polyester fiber or a polyacryl fiber, or a combination thereof.

In some implementations, the fiber constituting the fluffy may be made of polypropylene (PP), polyethylene (PE), polyethylene terephthalate (PET), polybutylene terephthalate (PBT), nylon or silicone.

In some implementations, the fiber constituting the fluffy may be configured to include an antimicrobial agent.

In some implementations, the fluffy may be divided into an internal layer and an external layer.

The internal layer is a layer located relatively inside in the fluffy. The internal layer is a layer coupled to the core.

The external layer is a layer located relatively outside in the fluffy. The external layer is extended from the internal layer to form the surface of the fluffy.

In some implementations, the internal layer may be configured to have waterproofness, water-repellency, or antimicrobiality.

The fiber of the fluffy may be configured so that a diameter decreases toward an apex.

In some implementations, the rotating cleaner may be configured to further include a dehydration flow path.

The dehydration flow path may be configured in a concave groove form in the fluffy.

A plurality of dehydration flow paths may be provided in the rotating cleaner.

A width of the dehydration flow path may be configured to be larger than a diameter of a fiber constituting the fluffy and smaller than a width of the first flow path.

Advantageous Effects

In some implementations, a first flow path which is a concave groove form is formed on an outer peripheral surface of a rotating cleaner, and the first flow path is configured in a direction inclined to a first rotary axis while crossing a fluffy. The outer peripheral surface of the rotating cleaner is covered with the fluffy except for the first flow path, and the first flow path is configured by one line in the rotating cleaner. A front space of the rotating cleaner is in communication with a suction port when the rotating cleaner rotates, and a suction force of the suction port can be concentrically delivered to a specific point of a front space of the rotating cleaner, and even when a suction nozzle is located at an edge of a wall surface, foreign substances can be effectively sucked.

In some implementations, the first flow path includes a boundary surface and a second boundary surface, and a reference line connecting a first front end portion of the first boundary surface and a second rear end portion of the second boundary surface is configured to be parallel to the first rotary axis. The present disclosure describes a vacuum cleaner having a flow path which enables the suction force formed at the suction port to be seamlessly delivered to the front space of the rotating cleaner when the rotating cleaner rotates.

In some implementations, a distance sensor is formed in the suction nozzle, and a rotary speed of a first motor of a cleaner body is configured to increase when a distance value sensed by the distance sensor is equal to or less than a reference value. As a result, a vacuum cleaner can be provided in which the suction force is momentarily increased when sensing the wall surface, so the foreign substances can be rapidly sucked at the edge of the wall surface, and a battery is efficiently used.

In some implementations, the distance sensor can be configured by an optical sensor. A distance from a front end of the suction nozzle to the distance sensor is configured to be shorter than a reference value, and in this case, the reference value is determined by a general movement speed of the suction nozzle of the vacuum cleaner, and a time for which a change of the suction force is delivered from the cleaner body to the suction nozzle. As a result, the suction force in the suction nozzle can be increased just before the suction nozzle touches a front wall, and efficient cleaning can be achieved while consumed energy (battery amount) is minimized.

In some implementations, the fiber constituting the fluffy may be configured to have waterproof or water repellency. In an embodiment, the fiber constituting the fluffy can be coated with a water repellent or a waterproof agent, and in another embodiment, the fiber constituting the fluffy may be configured by a waterproof fiber. For example, the fiber constituting the fluffy can be made of polypropylene (PP), polyethylene (PE), polyethylene terephthalate (PET), polybutylene terephthalate (PBT), nylon or silicone. Accordingly, water can be prevented from being absorbed by the fluffy of the rotating cleaner, and the removal of the water can be effectively performed when the fluffy is stained with the water.

In some implementations, the fiber constituting the fluffy can be configured to have antimicrobiality. In an embodiment, the fluffy can be configured to include an antimicrobial agent. Accordingly, it is possible to effectively prevent bacteria proliferation in the fluffy.

In some implementations, the fluffy can be divided into an internal layer and an external layer, and the internal layer can be configured to have waterproof or water repellency. When the water is absorbed in the fluffy, the water can move to the external layer rather than the internal layer, and when the vacuum cleaner is operated, a centrifugal force can be applied to the fluffy by the rotation of the rotating cleaner, and water stained in the external layer can be effectively removed by the centrifugal force.

In an embodiment, the fiber of the fluffy can be configured so that a diameter decreases toward an apex. Accordingly, when the fluffy is stained with the water, the water can be easily moved to the outer peripheral surface of the fluffy, and when the centrifugal force is applied to the fluffy, the water can be easily removed from the fluffy.

In an embodiment, the rotating cleaner is configured to include a dehydration flow path. The dehydration flow path can be configured in a concave groove form in the fluffy. The water stained in the fluffy can be effectively removed through the dehydration flow path, and in this case, a suction force transferred through the first flow path is not distributed to the dehydration flow path.

DESCRIPTION OF DRAWINGS

FIG. 4b is a side view illustrating the suction nozzle of FIG. 4a.

FIG. 5 is an exploded perspective view illustrating the suction nozzle of FIG. 4a.

Figure 10A:
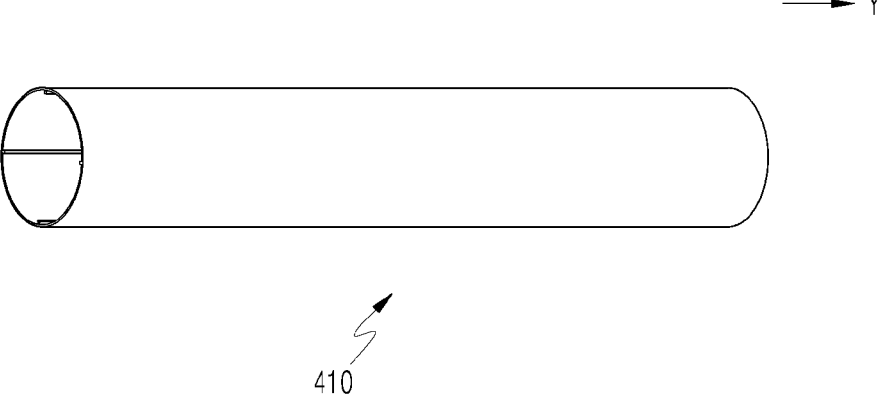
FIG. 10a is a diagram illustrating a corer of the rotating cleaner.
Figure 10B:
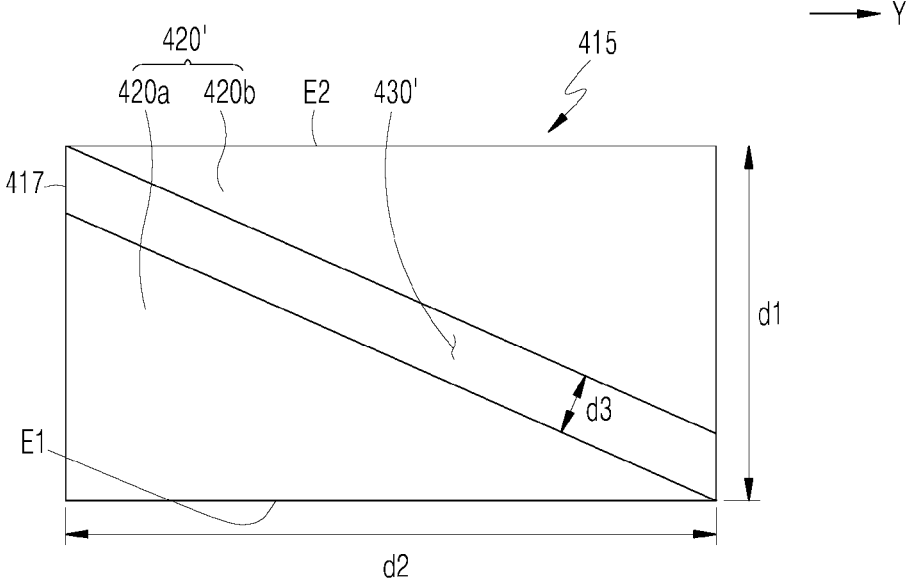
Figure 10C:
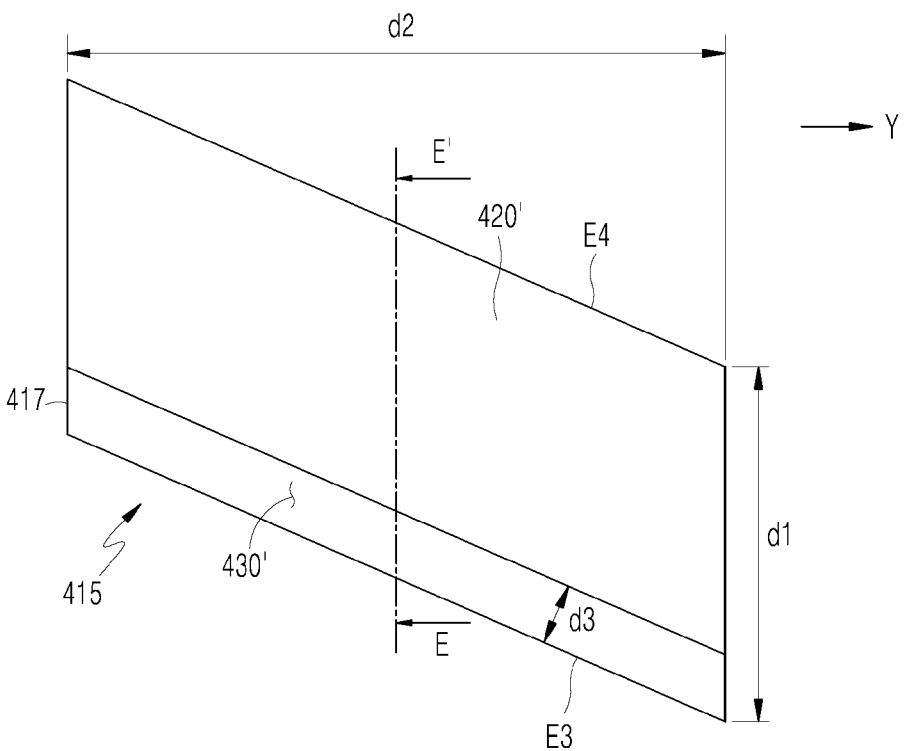

Each of FIGS. 10b and 10c are diagrams illustrating a view in which an outer peripheral surface layer constituting the rotating cleaner is unfolded.

Figure 10D:
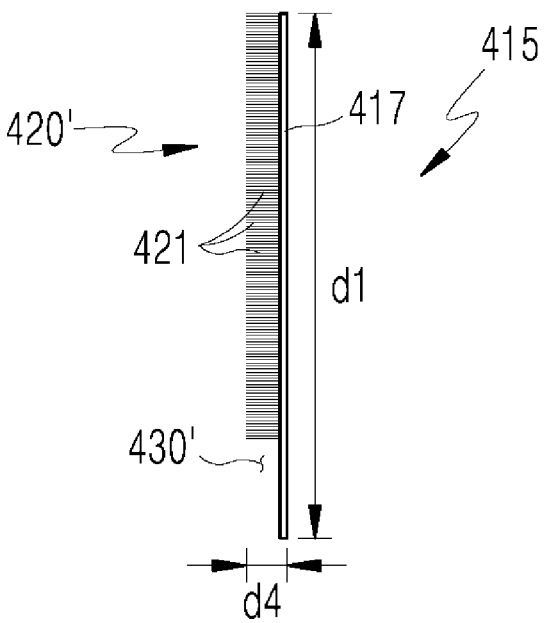

FIG. 10d is a diagram illustrating a cross section of the outer peripheral surface layer of FIG. 10c.

Figure 9:
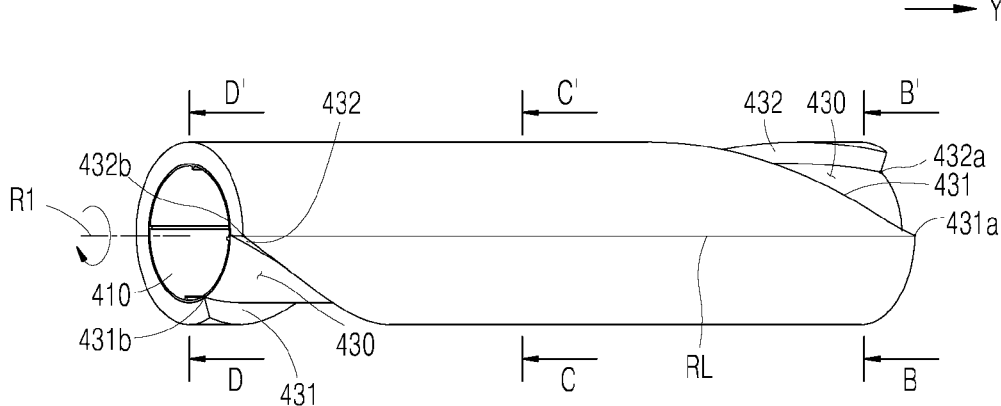
FIG. 9 is a diagram illustrating a rotating cleaner.
Figure 11A:
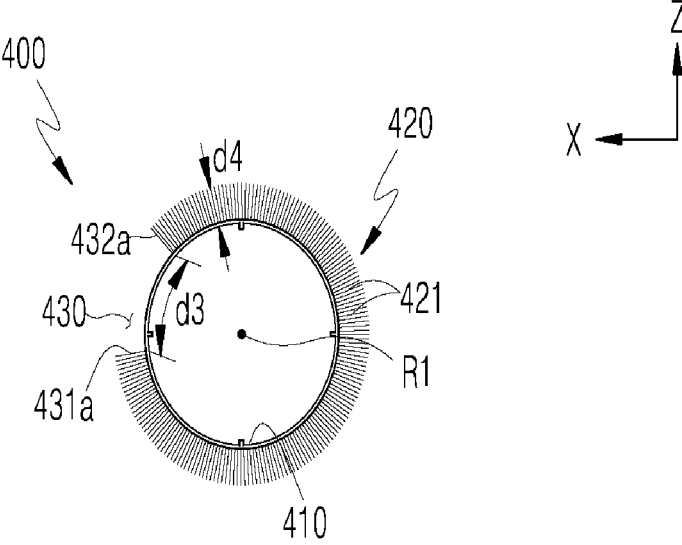
Figure 11B:
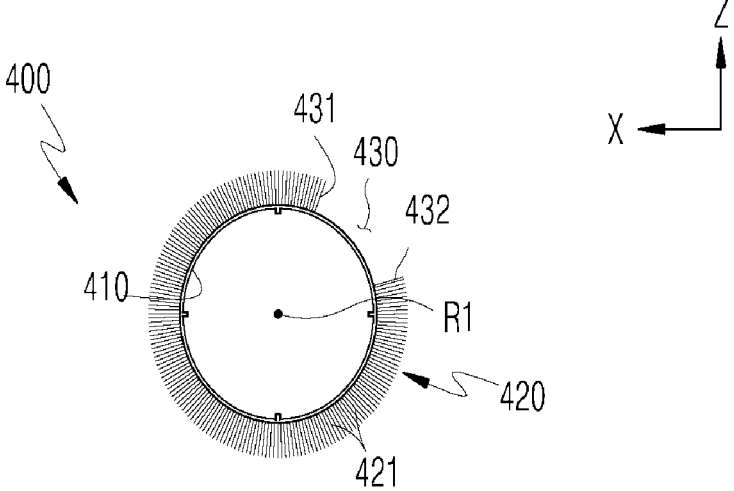
Figure 11C:
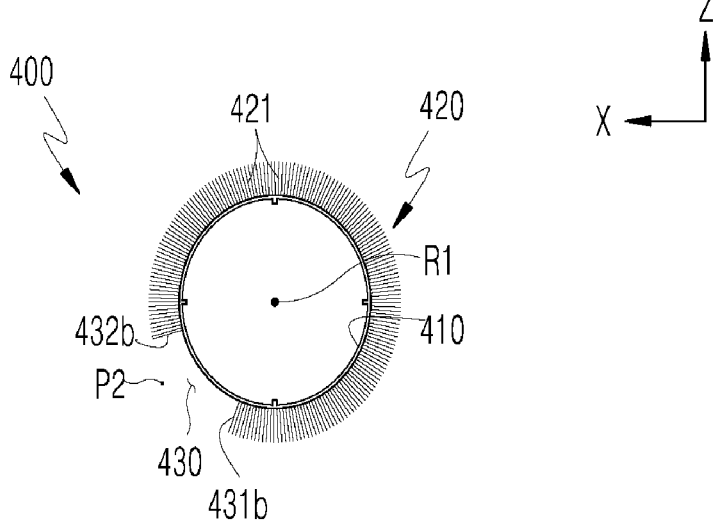

FIG. 11a illustrates a cross section in B-B' of FIG. 9, FIG. 11b illustrates a cross section in C-C' of FIG. 9, and FIG. 11c illustrates a cross section in D-D' of FIG. 9.

Figure 12A:
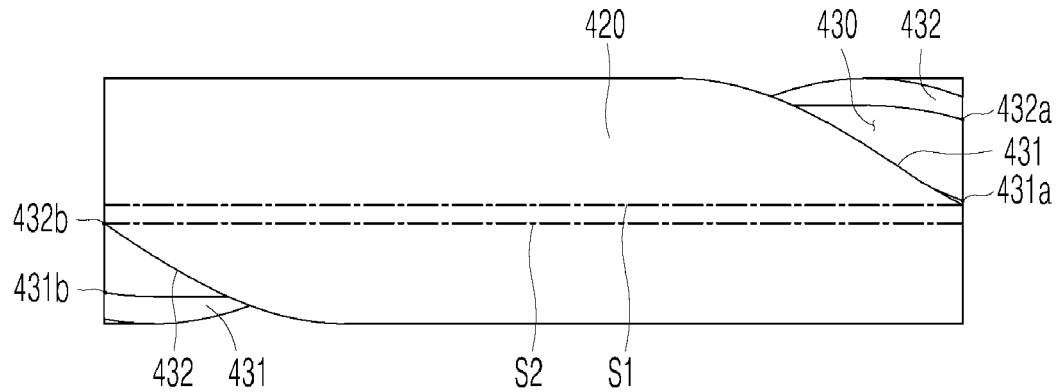
Figure 12B:
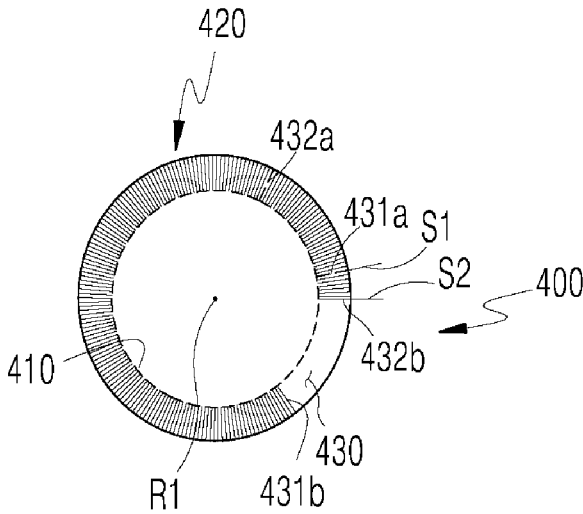

FIG. 12a is a diagram illustrating a rotating cleaner according to an embodiment and FIG. 12b is a side view illustrating the rotating cleaner of FIG. 12a.

Figure 13:
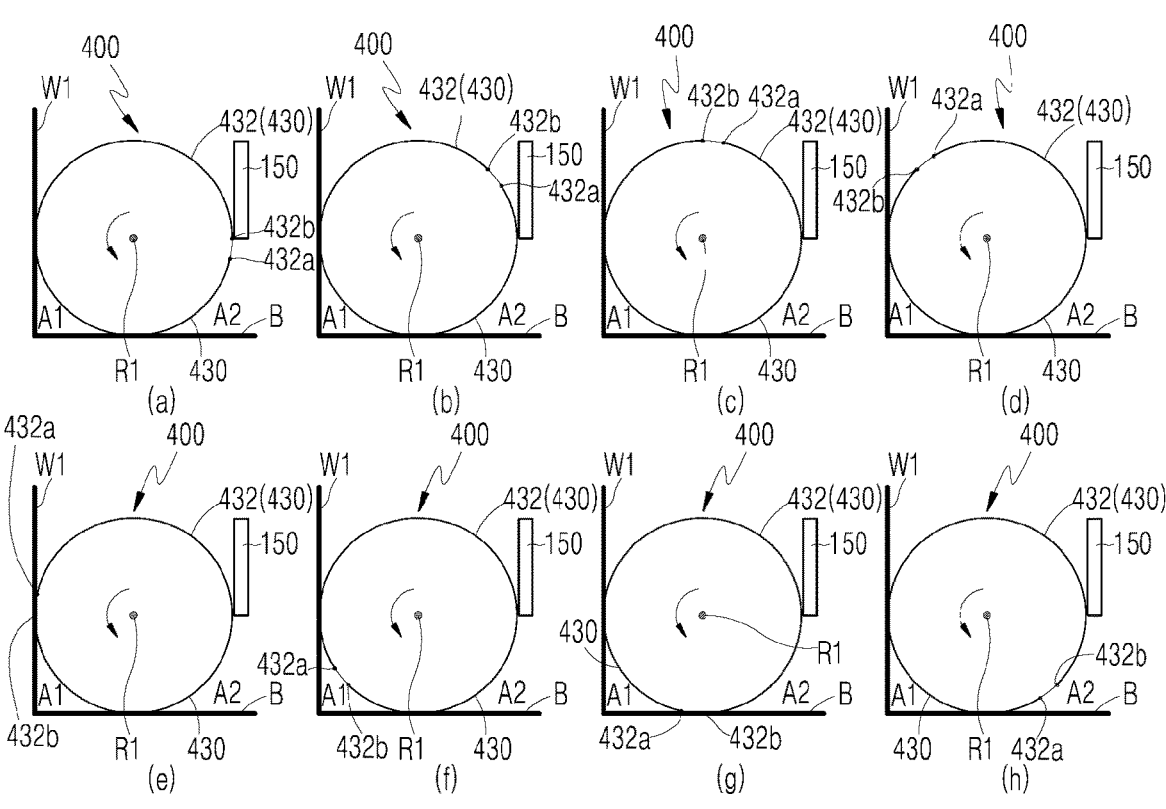

Each of (a), (b), (c), (d), (e), (0, (g), and (h) of FIG. 13 is a diagram schematically illustrating a view in which the rotating cleaner rotates in a state of touching a floor surface and a front wall surface.

Figure 14:
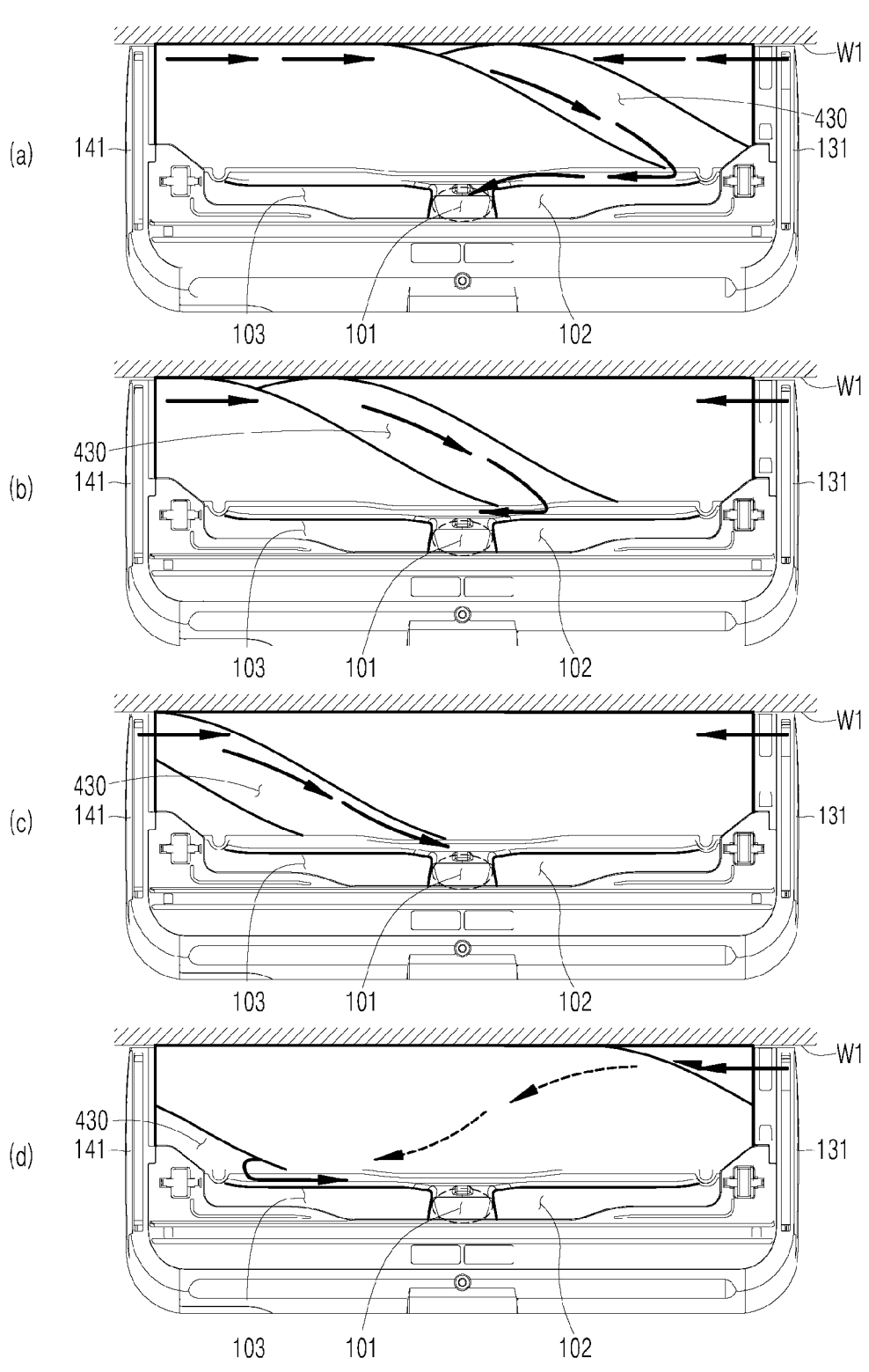

Each of (a), (b), (c), and (d) of FIG. 14 as a diagram illustrating the suction nozzle touching the front wall surface viewed from the bottom is a diagram schematically illustrating a direction and a route in which air moves.

Figure 15:
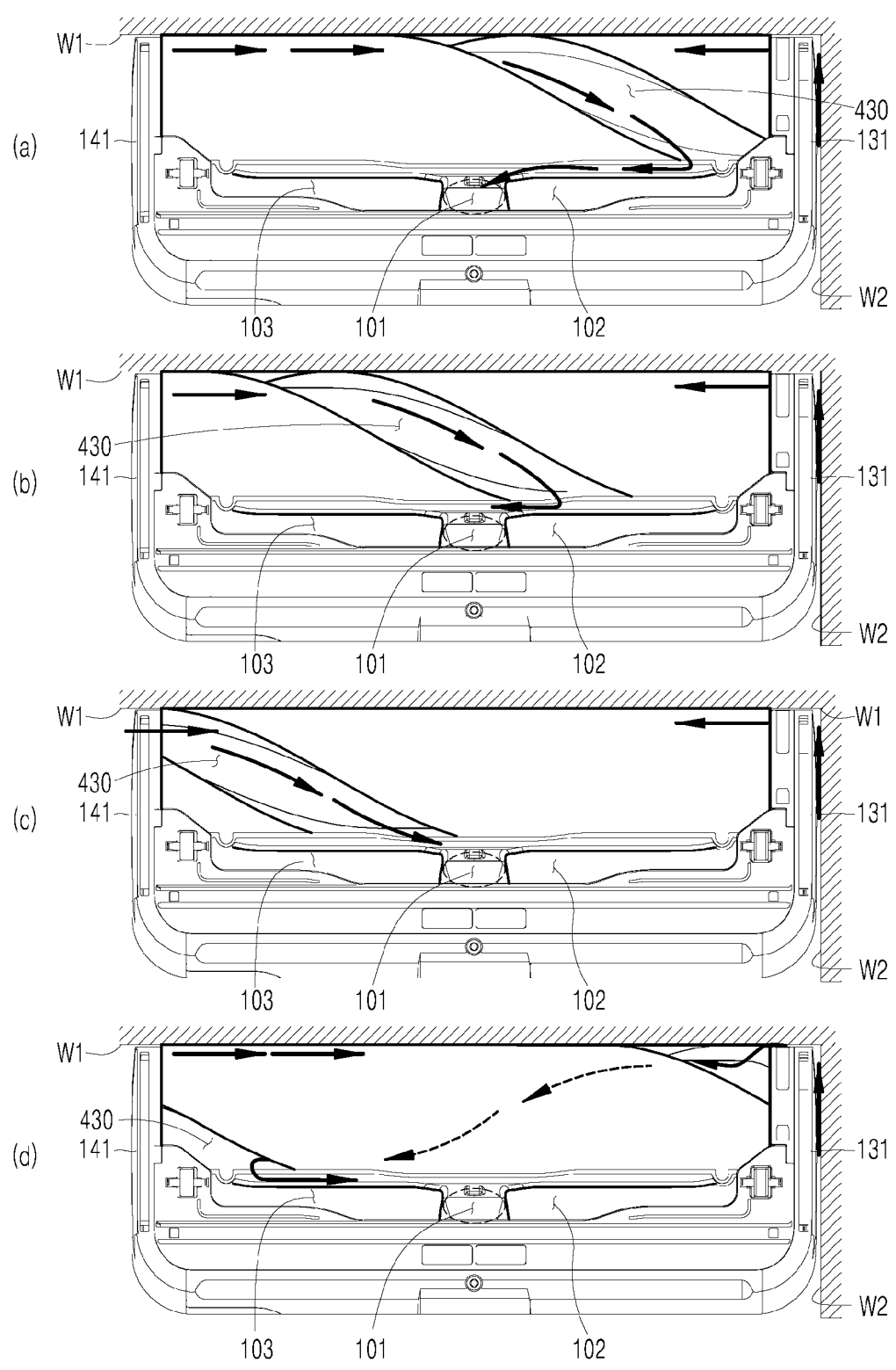

Each of (a), (b), (c), and (d) of FIG. 15 as a diagram illustrating the suction nozzle touching the front wall surface and a left wall surface viewed from the bottom is a diagram schematically illustrating the direction and the route in which air moves.

Figure 16:
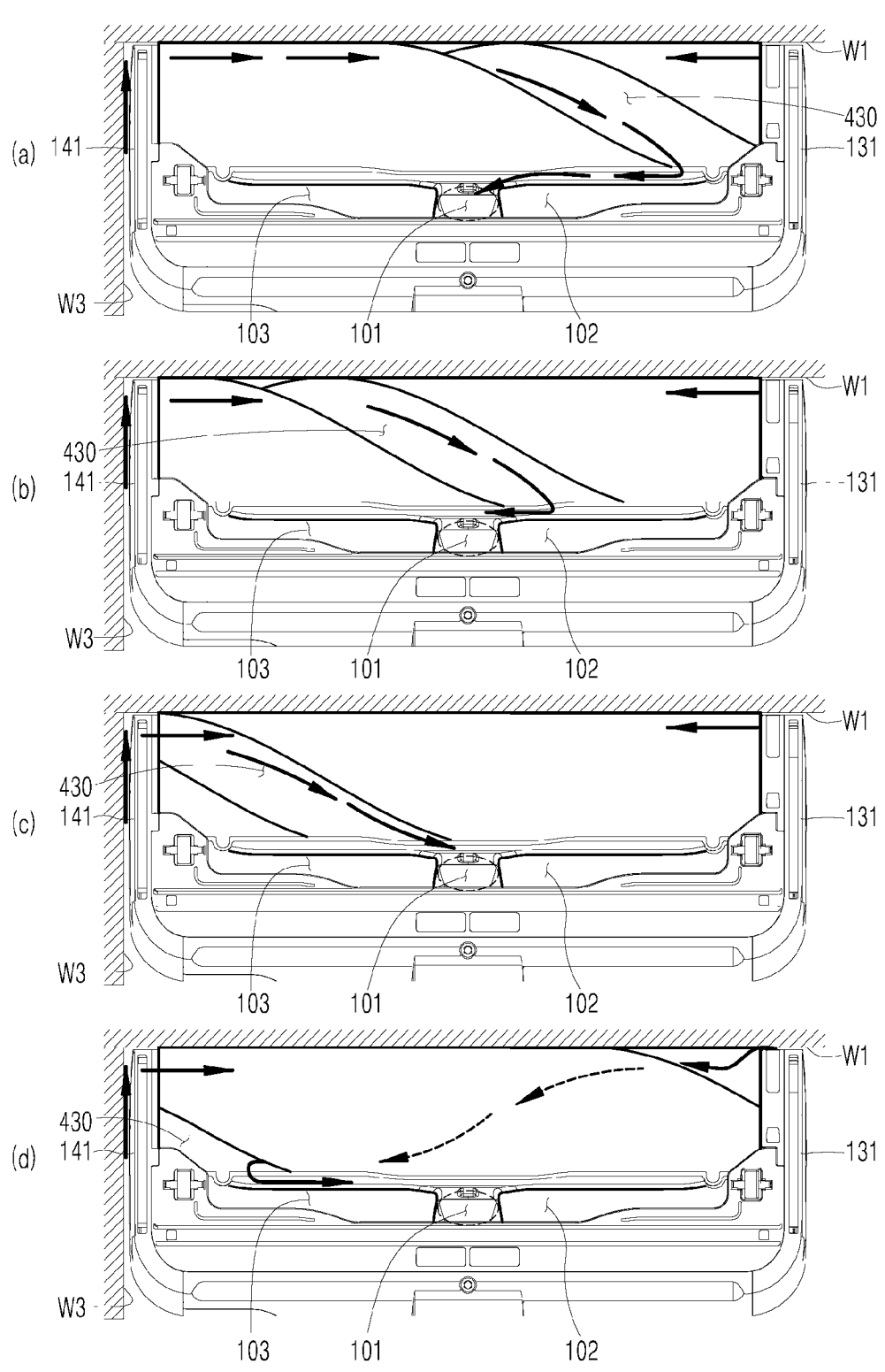

Each of (a), (b), (c), and (d) of FIG. 16 as a diagram illustrating the suction nozzle touching the front wall surface and a right wall surface viewed from the bottom is a diagram schematically illustrating the direction and the route in which air moves.

Figure 17:
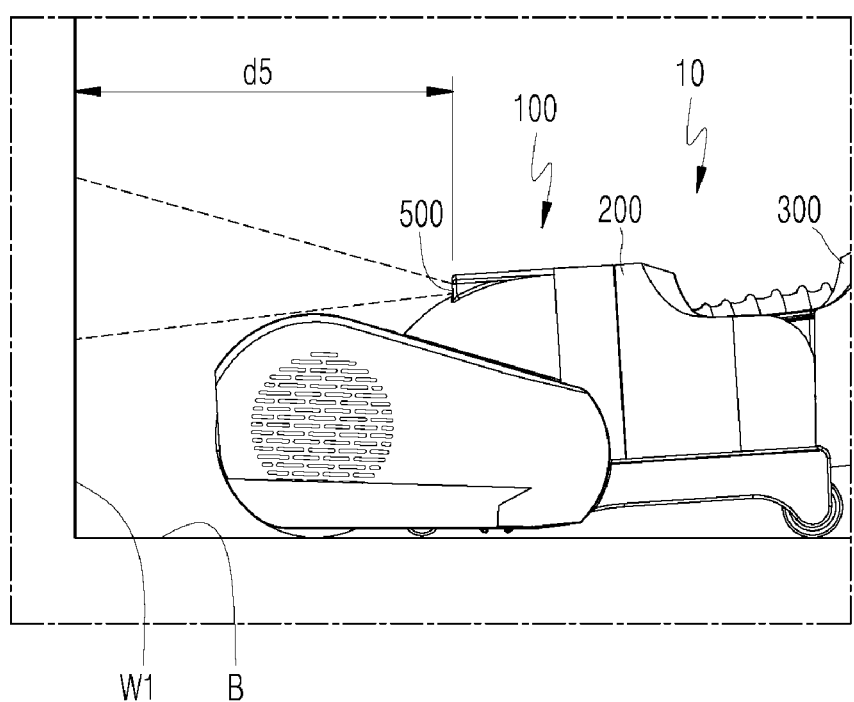

FIG. 17 as a side view of the suction nozzle is a diagram schematically illustrating a view in which the front wall surface is sensed by a distance sensor.

Figure 18A:
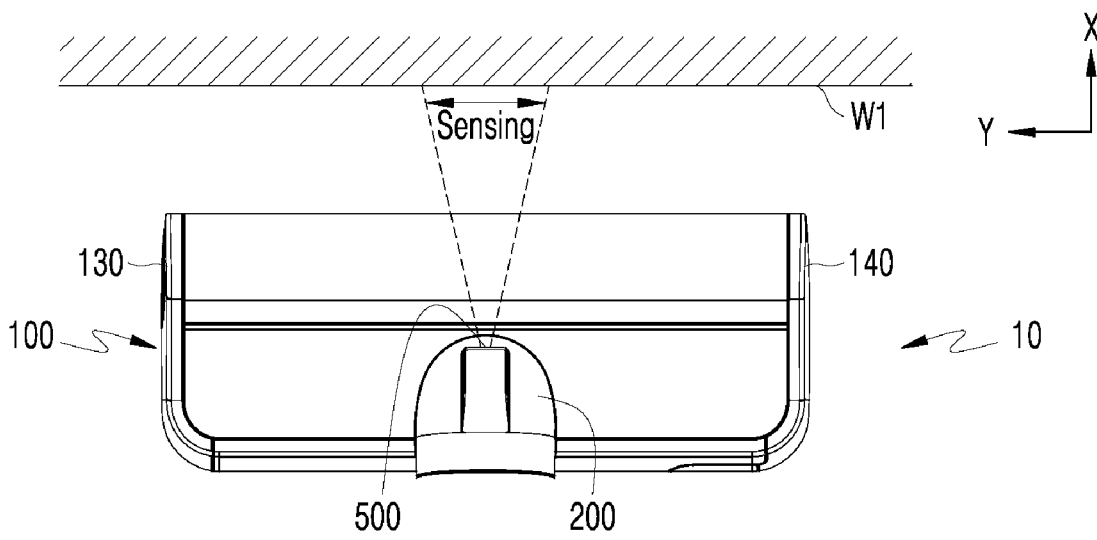
Figure 18B:
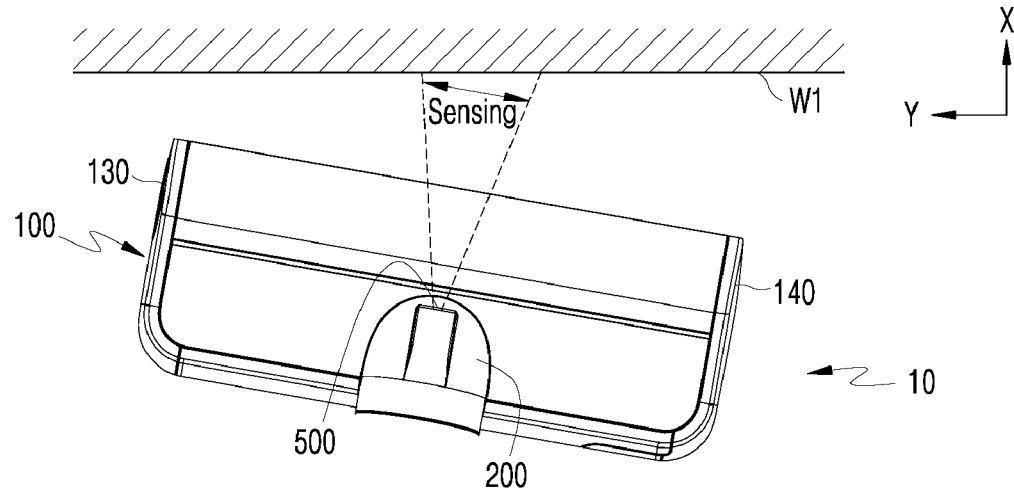
Figure 18C:
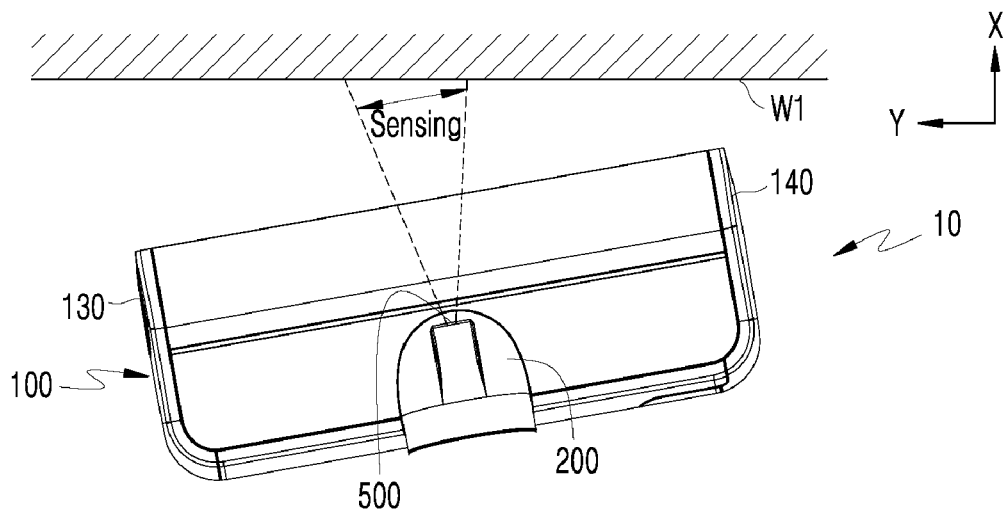
Figure 19:
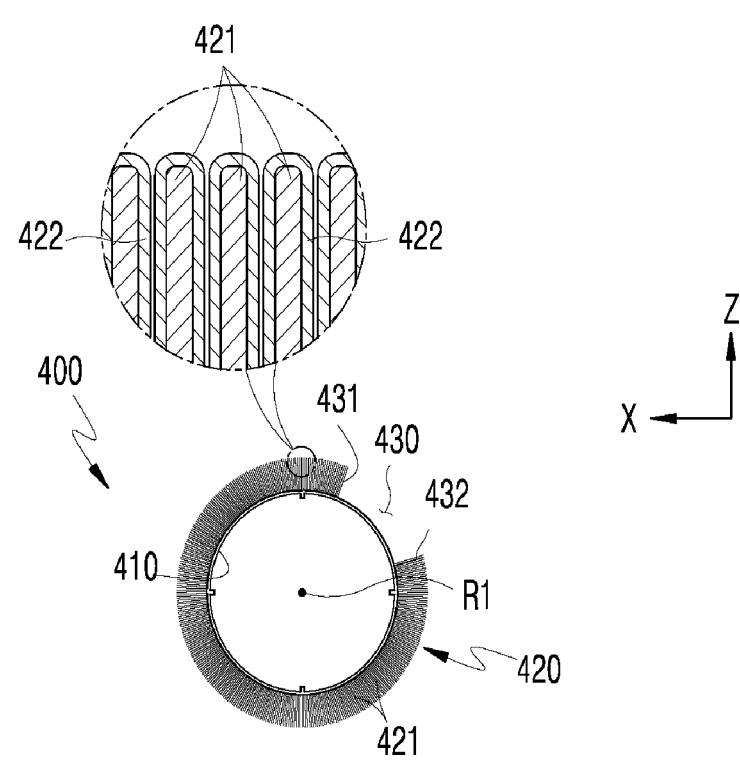
Figure 20:
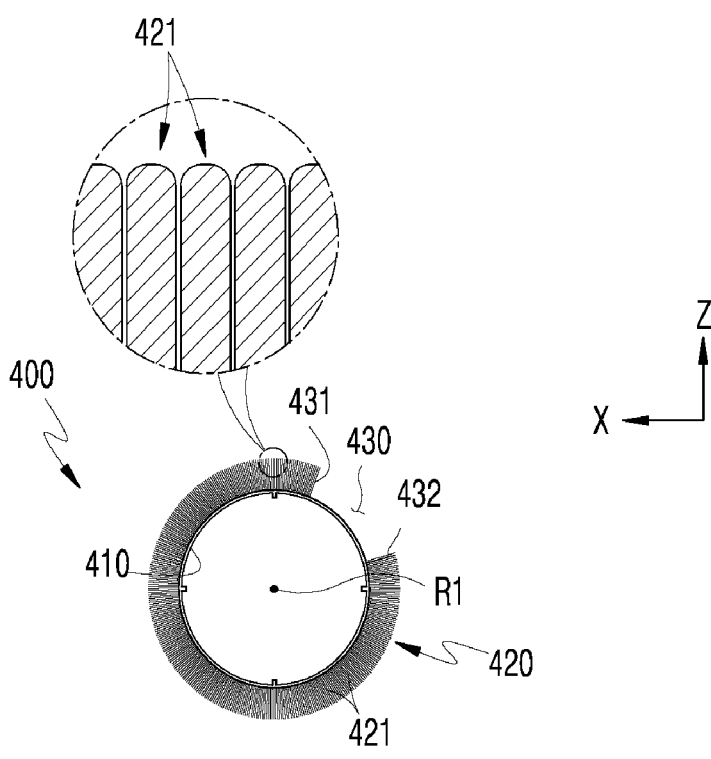
Figure 21:
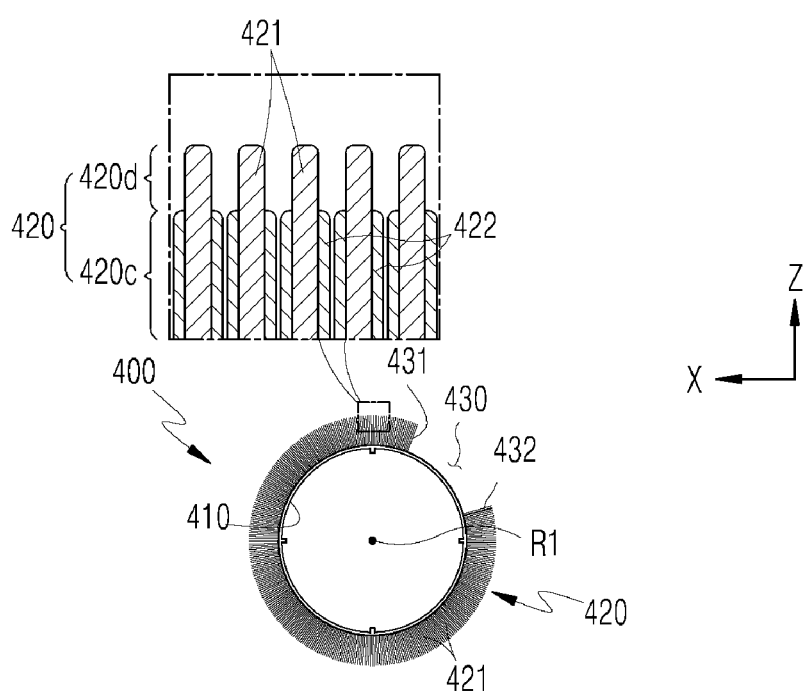
Figure 22:
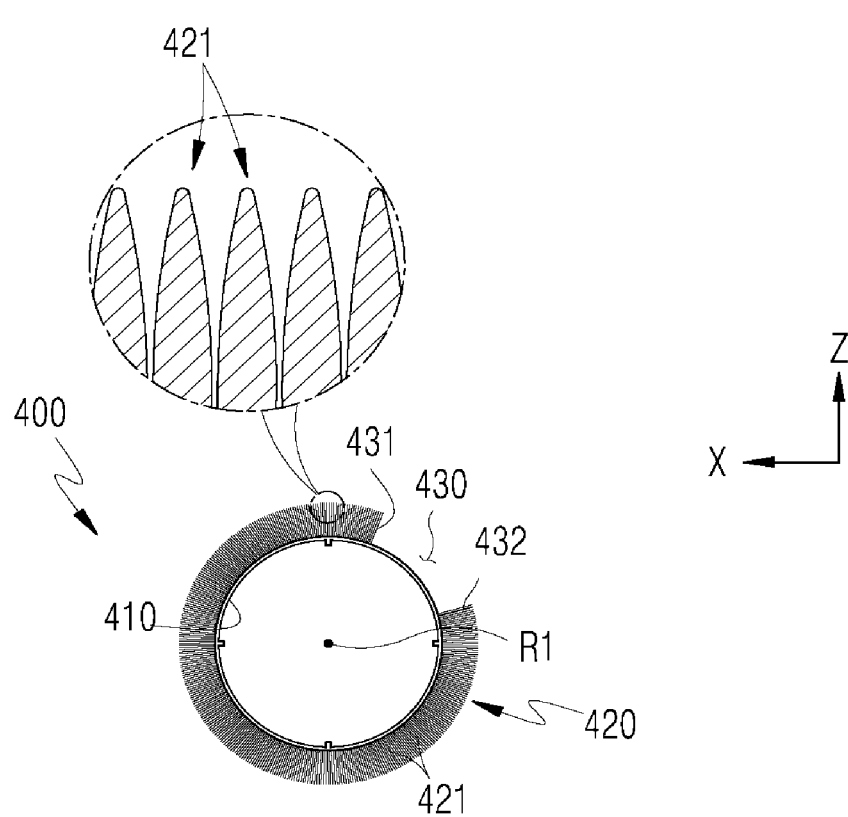

Each of FIGS. 18a, 18b, and 18c as a diagram illustrating the suction nozzle from the top is a diagram schematically illustrating a view in which the front wall surface is sensed by the distance sensor.

FIGS. 19 to 22 are transverse cross-sectional views illustrating rotating cleaners according to different embodiments, respectively.

Figure 23A:
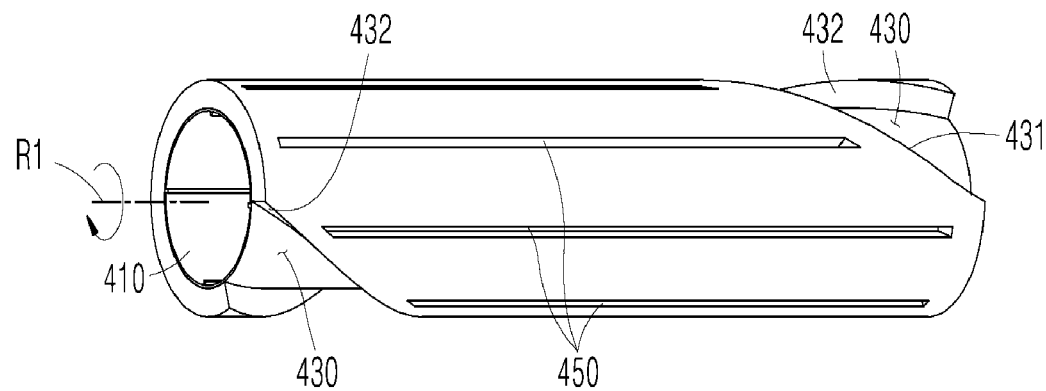
Figure 23B:
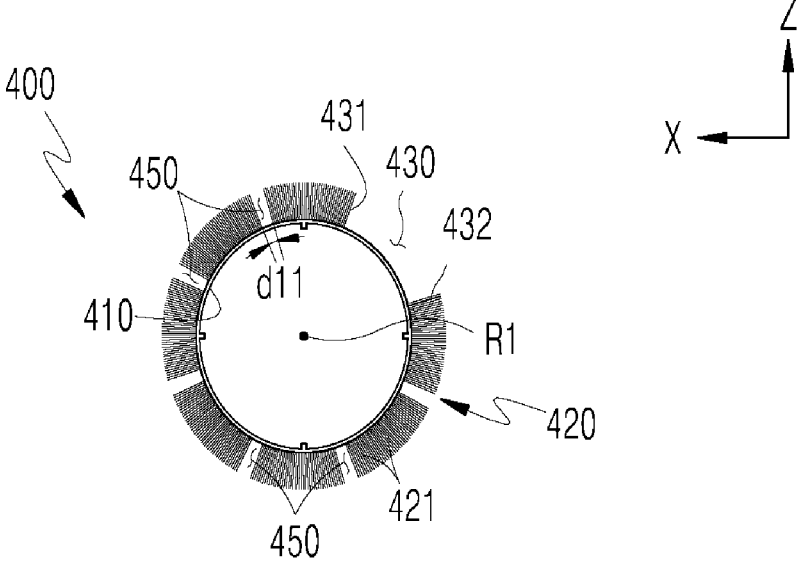

FIG. 23a is a diagram illustrating a rotating cleaner according to an embodiment and FIG. 23b is a transverse cross-sectional view illustrating the rotating cleaner of FIG. 23a.

MODES FOR THE INVENTION

Hereinafter, in order to describe the present invention in more detail, embodiments according to the present invention will be described in more detail with reference to the accompanying drawings. Like reference numerals refer to like elements throughout the detailed description.

Figure 1:
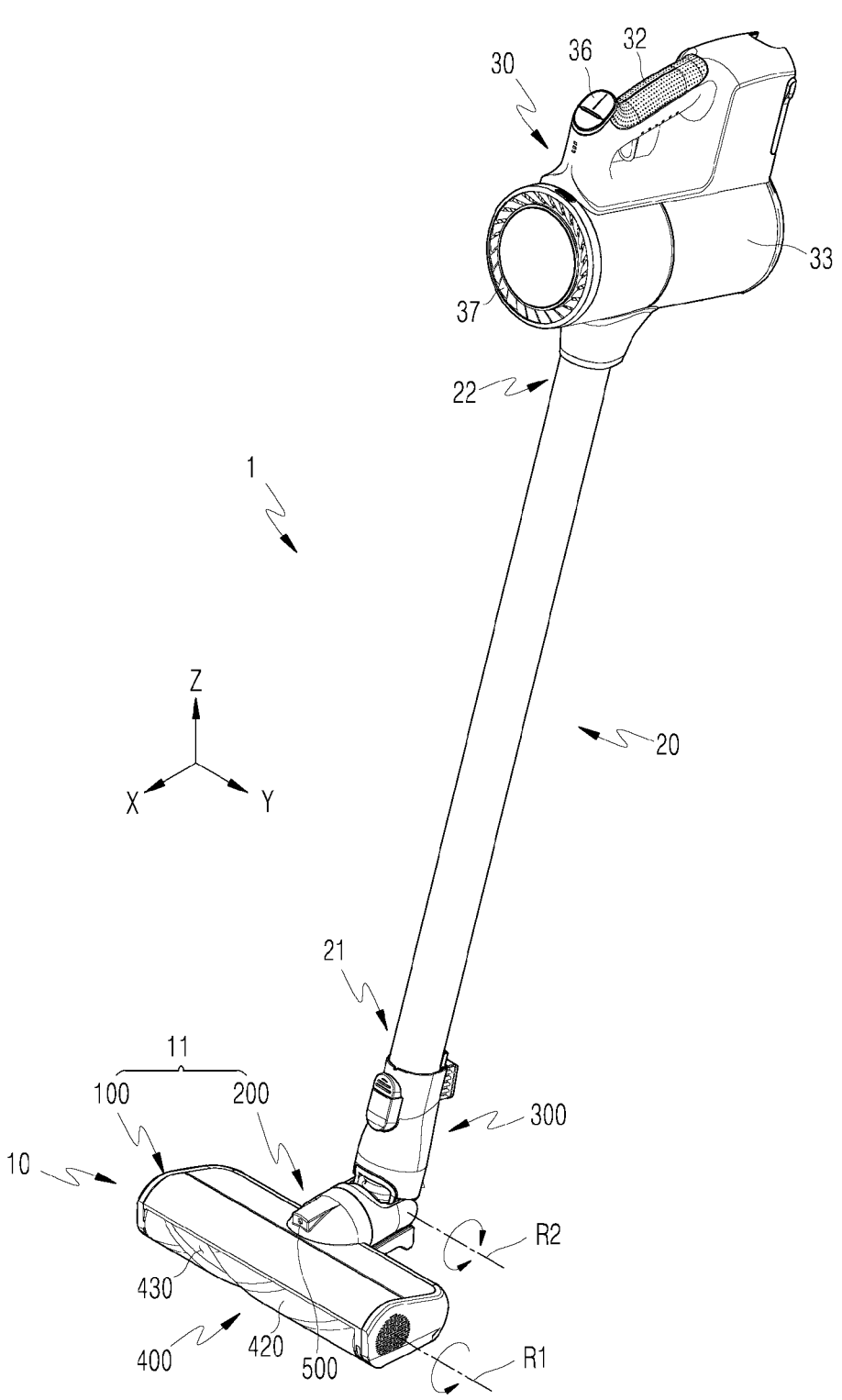
FIG. 1 is a perspective view illustrating a vacuum cleaner according to an embodiment of the present invention.

FIG. 1 is a perspective view illustrating a vacuum cleaner 1 according to an embodiment of the present disclosure.

Figure 2:
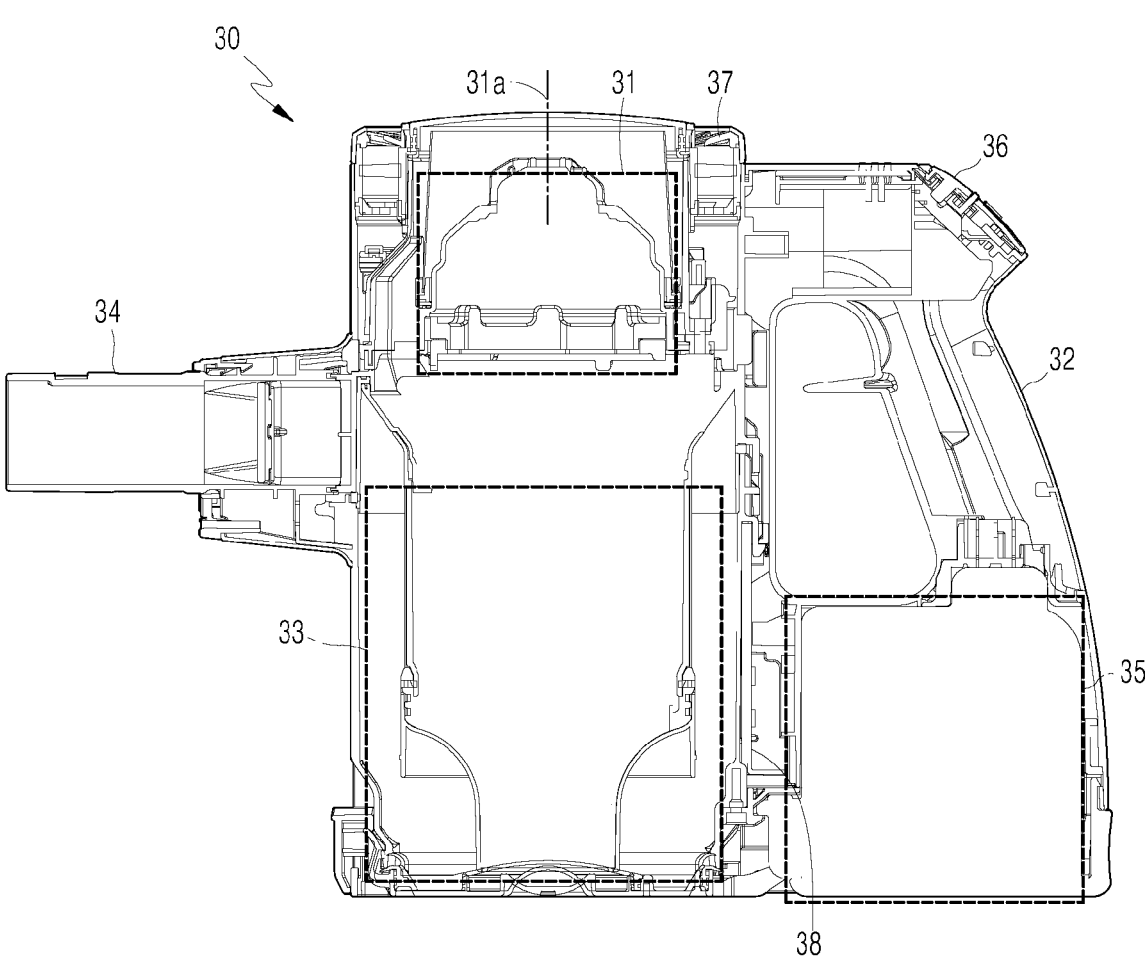
FIG. 2 is a cross-sectional view illustrating a cleaner body. Positions of components provided in the cleaner body are schematically illustrated in FIG. 2.

FIG. 2 is a cross-sectional view illustrating a cleaner body 30. Positions of components provided in the cleaner body 30 are schematically illustrated in FIG. 2.

The vacuum cleaner 1 is configured to suck external air and/or foreign substances such as dust, hairs, etc.

In an embodiment, the vacuum cleaner 1 is configured to include the cleaner body 30 and a suction nozzle 10. The vacuum cleaner 1 may be configured to further include a connection pipe 20, and the cleaner body 30 and the suction nozzle 10 may be connected through the connection pipe 20.

Figure 6:
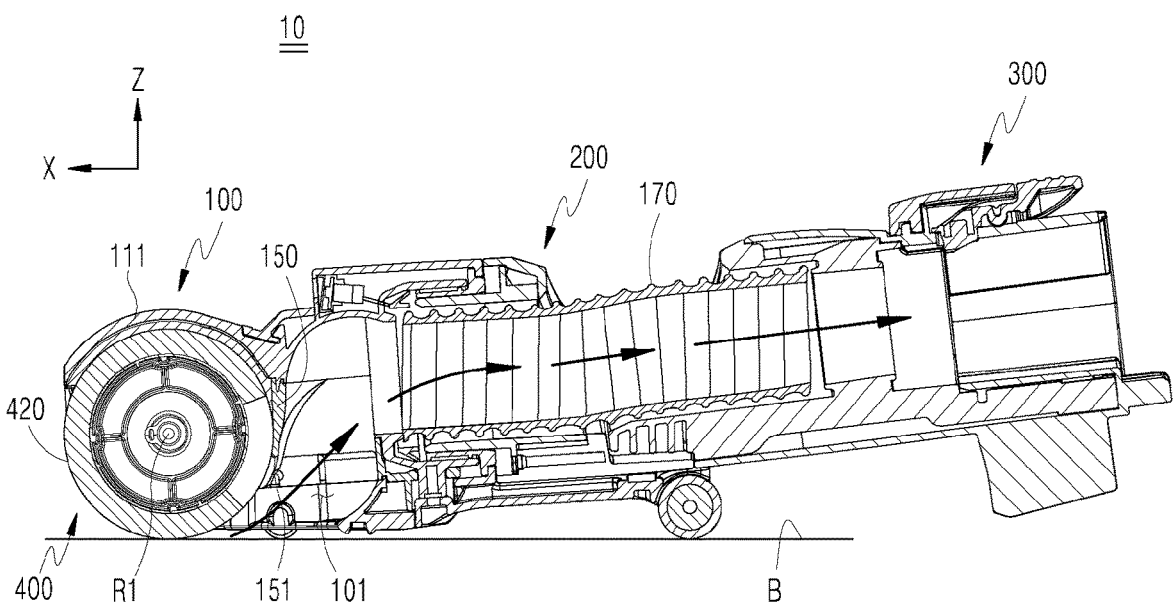
FIG. 6 is a cross-sectional view schematically illustrating the suction nozzle in A-A' of FIG. 4a. A movement direction of air introduced into a suction port is schematically illustrated in FIG. 6.

The suction nozzle 10 includes a suction port 101 which is a hole (inlet) through which the external air and the foreign substances are introduced (see FIG. 6). The external air and the foreign substances are first introduced through the suction port 101 of the suction nozzle 10, and then moved to the cleaner body 30 via the connection pipe 20.

The suction nozzle 10 will be described below in detail.

The cleaner body 30 is configured to generate a suction force.

To this end, the cleaner body 30 includes a first motor. The first motor 31 rotates inside the cleaner body 30 so that the suction force is formed in the suction port 101.

In an embodiment, motors described in the embodiment of the present invention, which include the first motor 31 may be constituted by a BLDC motor or a step motor.

A fan is coupled to a rotary axis 31a of the first motor 31 of the cleaner body 30, and as a result, the flow of the air is generated when the first motor 31 rotates.

The first motor 31 and the fan coupled to the first motor 31 rotate around the rotary axis 31a, so a pressure difference between the inside and the outside of the cleaner body 30 may be generated, as a result, the suction force may be generated in the cleaner body 30.

The connection pipe 20 connects the cleaner body 30 and the suction nozzle 10. The connection pipe 20 is configured in the form of a pipe or tube, and forms a passage in which the external air introduced through the suction port 101 moves toward the cleaner body 30.

The connection pipe 20 may be made of a comparatively hard material so as not to be bent or deformed unintentionally. The connection pipe 20 may be made of plastic or metal or configured to include the plastic and the metal.

The connection pipe 20 is configured to include a first connection unit 21 and a second connection unit 22.

The first connection unit 21 may form the inlet of the connection pipe 20 through which the external air is introduced into the connection pipe 20, and the second connection unit 22 may form an outlet of the connection pipe 20 through which the air inside the connection pipe 20 is discharged to the cleaner body 30.

The first connection unit 21 and the second connection unit 22 may form both end portions of the connection pipe 20.

In an embodiment, the cleaner body 30 may be fixedly coupled to the second connection unit 22 of the connection pipe 20. That is, the cleaner body 30 and the connection pipe 20 may be configured in a form not to be separately moved, but to be fixed to each other. In this case, the vacuum cleaner 1 may be configured in a form of 'stick type cleaner'.

In another embodiment, the cleaner body 30 may be coupled to the second connection unit 22 of the connection pipe 20 via a separate means. For example, a separate hose which is flexibly bent may be coupled between the connection pipe 20 and the cleaner body 30. That is, in the vacuum cleaner 1, the cleaner body 30 and the connection pipe 20 may be configured to be separately moved. In this case, the vacuum cleaner 1 may be configured in a form of 'canister type cleaner'.

Hereinafter, as illustrated in FIG. 1, the present invention will be described based on a form in which the cleaner body 30 is fixed to the second connection unit 22 of the connection pipe 20 and the suction nozzle 10 is fixed to the first connection unit of the connection pipe 20.

In an embodiment, the cleaner body 30 may be configured to include a handle 32, a dust tank 33, a body suction port 34, and a battery 35. A control unit 38 may be provided in the cleaner body 30.

The handle 32 is formed at one side of the cleaner body 30. The handle 32 is configured in a form to be stably gripped by using a hand by a user. The handle 32 may be formed at a side opposite to the body suction port 34 (an opposite side to the body suction port 34). If the body suction port 34 is formed in front of the cleaner body 30, the handle 32 may be formed in the rear of the cleaner body 30.

A manipulation button 36 capable of manipulating the vacuum cleaner 1 may be provided at a position adjacent to the handle 32 in the cleaner body 30.

The dust tank 33 is a container configured to collect the foreign substances such as the dust separated from the air inside the cleaner body 30. The foreign substances such as the dust introduced into the cleaner body 30 may be separated from the air by a cyclone scheme. In addition, the air separated from the dust inside the cleaner body 30 may be discharged to the outside of the cleaner body 30 through a separate discharge port 37.

The dust tank 33 may be detachably coupled to the cleaner body 30. The dust tank 33 may be configured to be transparent so as identify the dust collected therein with naked eyes.

The battery 35 is configured to supply a power to each component constituting the vacuum cleaner 1. The battery 35 may supply the power to the first motor 31 of the cleaner body 30, and supply the power to a second motor 470 of the suction nozzle 10.

The body suction port 34 forms the inlet of the cleaner body 30 through which the air, the dust, etc., are introduced into the cleaner body 30. The body suction port 34 may be configured in a form which protrudes outside the cleaner body 30.

The second connection unit 22 of the connection pipe 20 may be fixedly coupled to the body suction portion 34.

The control unit 38 is configured to control an operation of the vacuum cleaner 1, and control the operation of each part constituting the vacuum cleaner 1. The control unit 38 may be configured to include a central processing unit. A storage medium storing an application program may be provided in the vacuum cleaner 1 for the control by the control unit 38, and the control unit 38 may be configured to control the vacuum cleaner 1 by driving the application program according to information input into the vacuum cleaner 1, information output from the vacuum cleaner 1, information acquired by the vacuum cleaner 1, etc.

Figure 3:
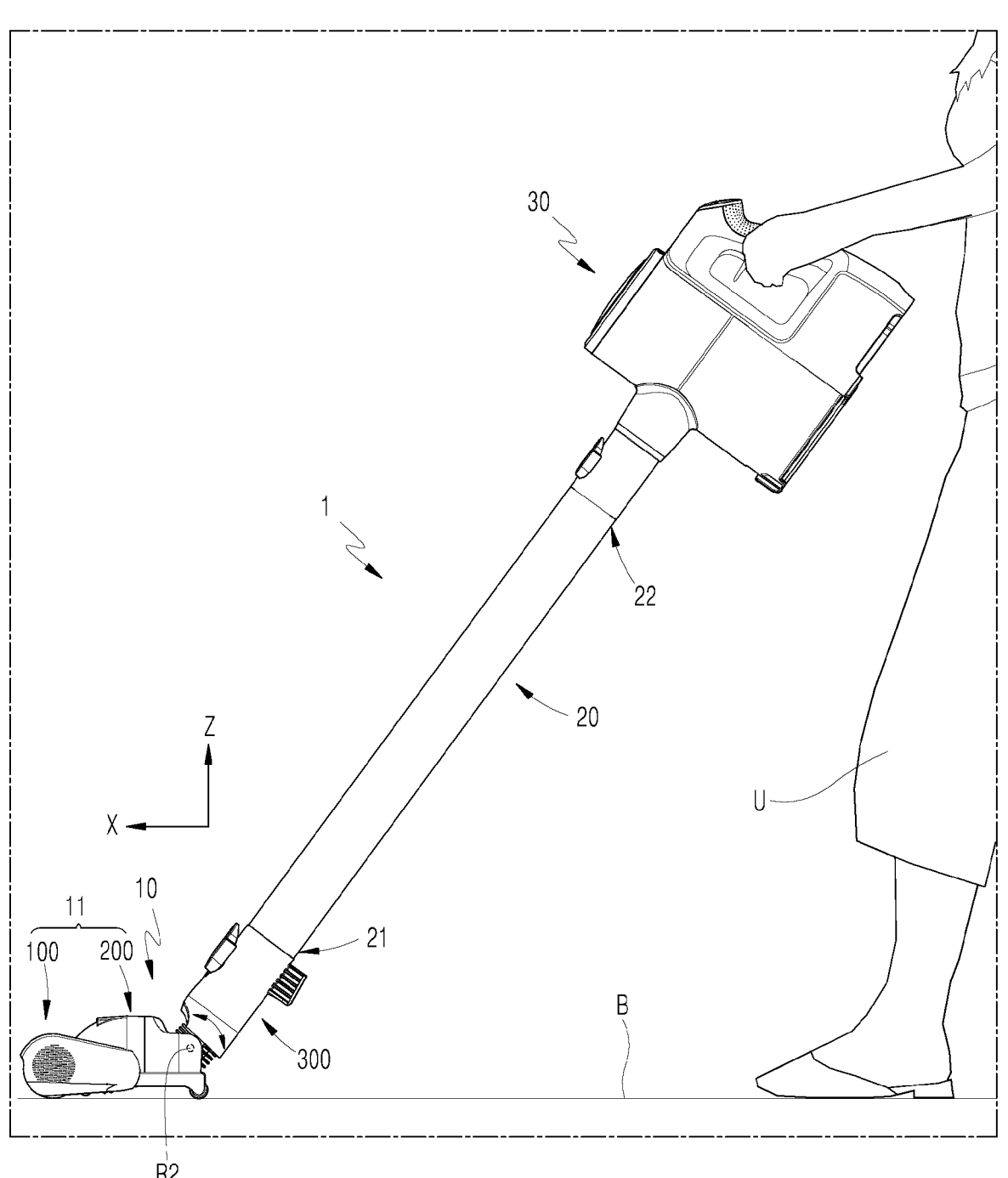
FIG. 3 is a diagram illustrating a usage state of the vacuum cleaner.

FIG. 3 is a diagram illustrating a usage state of the vacuum cleaner 1.

Figure 4A:
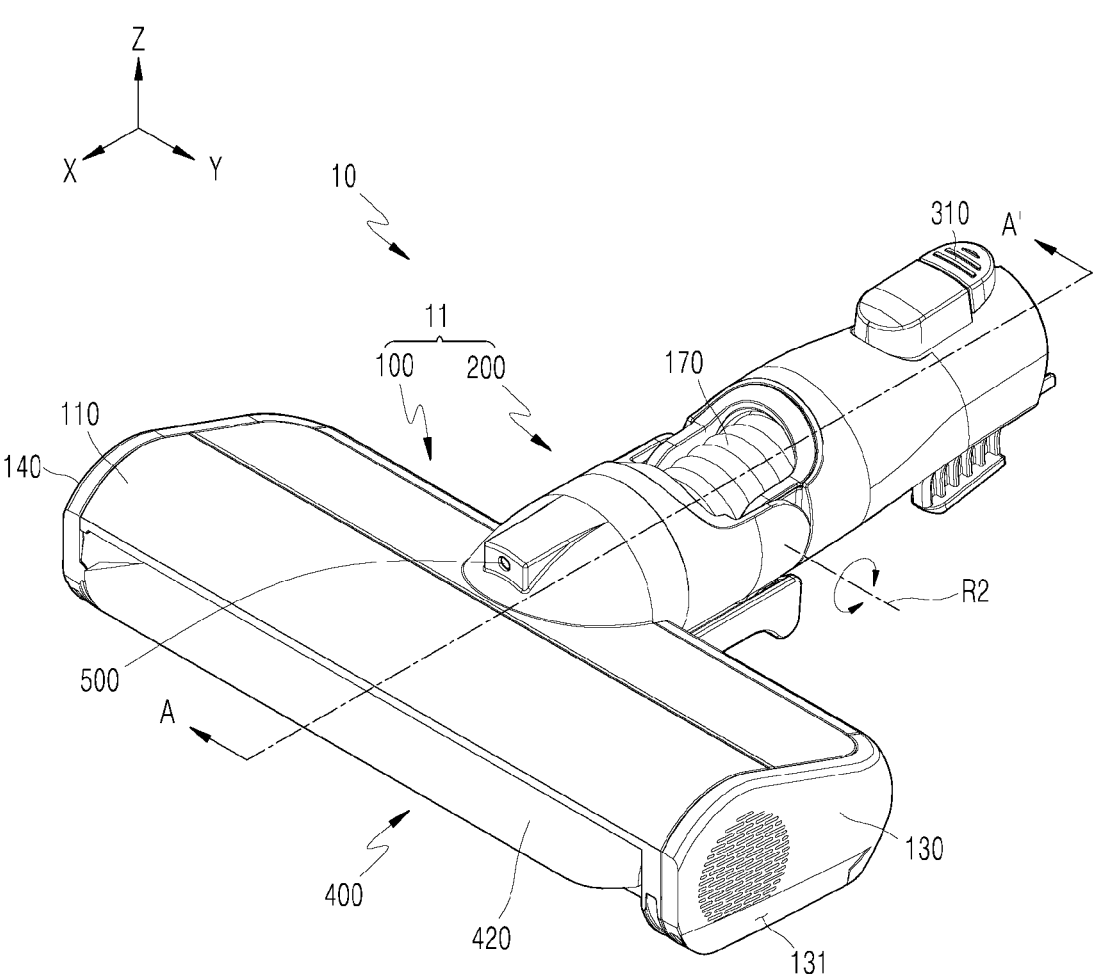
FIG. 4a is a perspective view illustrating a suction nozzle according to an embodiment of the present invention.

FIG. 4a is a perspective view illustrating a suction nozzle 10 according to an embodiment of the present invention.

Figure 4B:
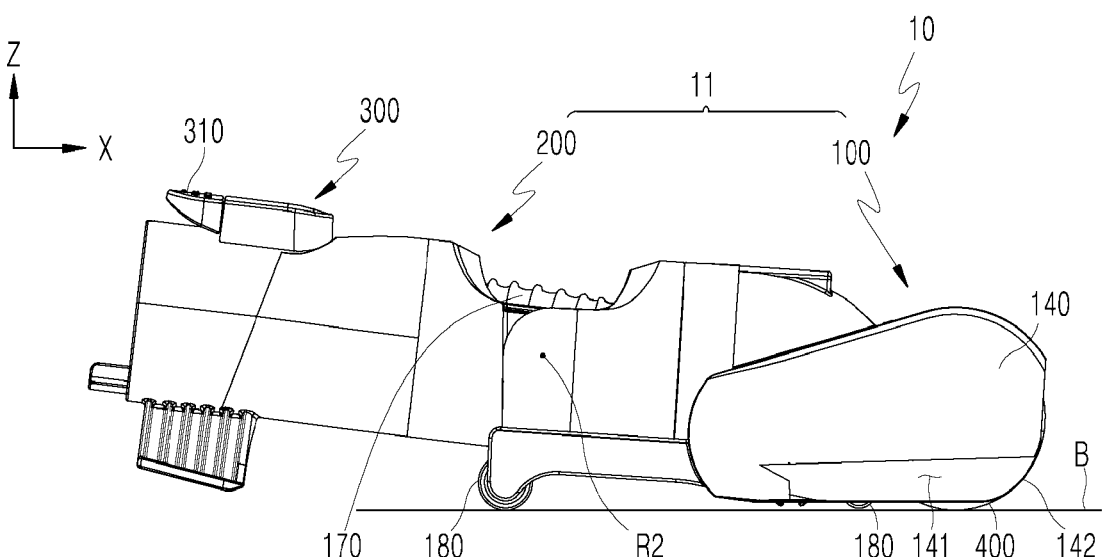

FIG. 4b is a side view illustrating the suction nozzle of FIG. 4a at an opposite side.

Figure 5:
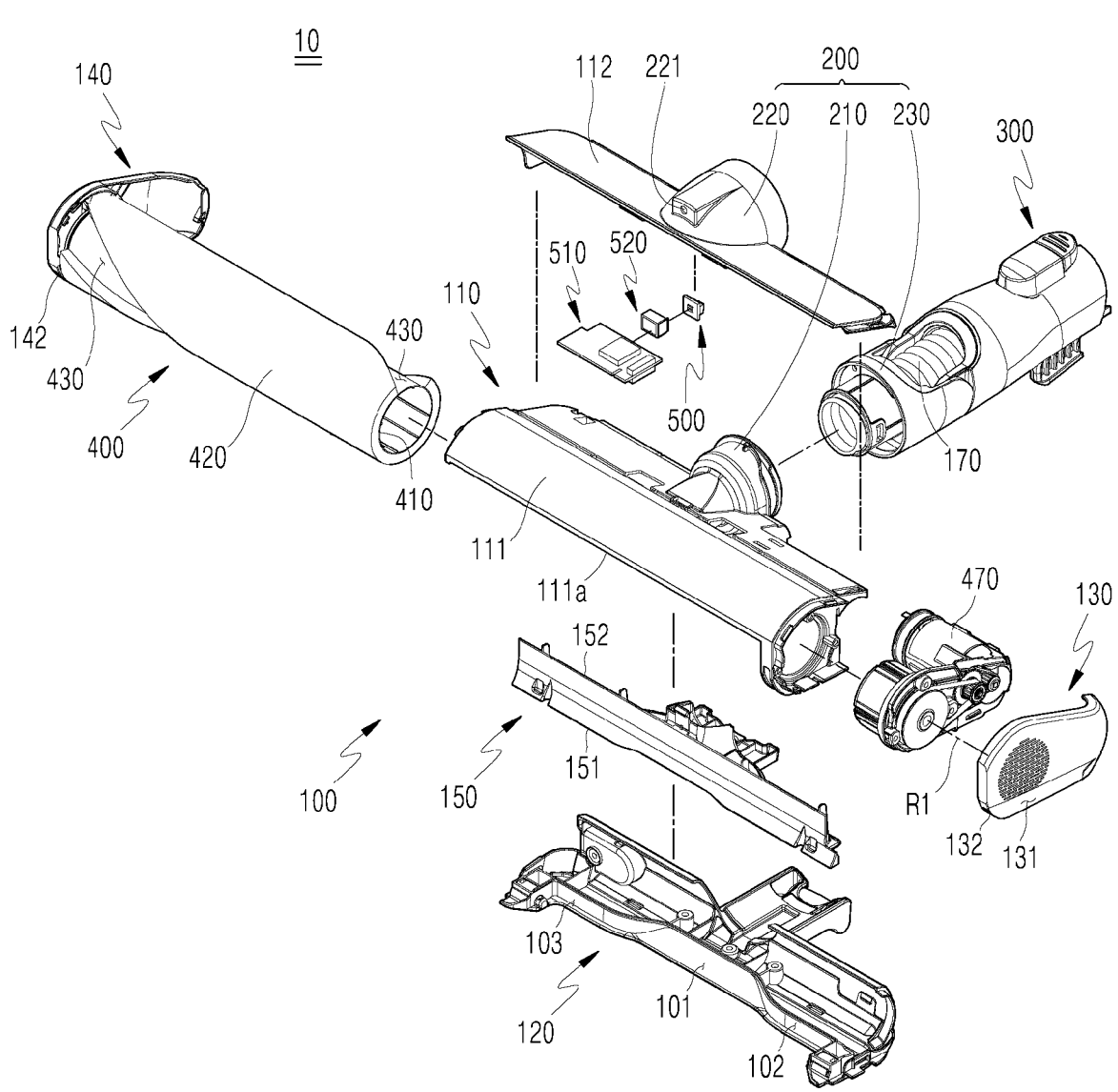

FIG. 5 is an exploded perspective view illustrating the suction nozzle 10 of FIG. 4a.

FIG. 6 is a cross-sectional view schematically illustrating the suction nozzle 10 of FIG. 4a.

A first direction X, a second direction Y, and a third direction Z described in the embodiment of the present invention are directions orthogonal to each other. The first direction X may be a front direction of the vacuum cleaner 1, the second direction Y may be a left direction of the vacuum cleaner 1, and the third direction Z may be an upper direction of the vacuum cleaner 1. The first direction X and the second direction Y may be directions parallel to a bottom surface B, and the third direction Z may be a direction parallel to the bottom surface B.

A front-rear direction described in the embodiment of the present invention may be a direction parallel to the first direction X, a left-right direction may be a direction parallel to the second direction Y, and an upper-lower direction may be a direction parallel to the third direction Z.

A user U may use the vacuum cleaner 1 in a state of gripping the cleaner body 30, and in this case, the connection pipe 20 may be placed to be inclined to a front lower side of the user U, and the suction nozzle 10 may be located on the bottom surface B in front of the user U. In such a state, the use of the vacuum cleaner 1 may be a natural usage state of the vacuum cleaner 1.

In an embodiment, the suction nozzle 10 may be configured in a structure suitable for sucking the dust while being placed on the front bottom surface B of the user U. To this end, the suction nozzle 10 may be configured in which the front and rear directions are distinguished from each other and the upper and lower directions are distinguished from each other.

When it is assumed that the suction nozzle 10 is placed on a flat bottom surface B in a horizontal direction, each of the front direction (first direction X) and the left direction (second direction Y) of the suction nozzle 10 may be a direction parallel to the horizontal direction, and the upper direction (third direction Z) of the suction nozzle 10 may be a direction parallel to a vertical direction.

The suction nozzle 10 may be formed in a left-right symmetrical form.

As described above, the suction nozzle 10 is configured to include the suction port 101.

The suction port 101 may be an initial inlet through which the dust is introduced into the vacuum cleaner 1, and the suction nozzle 10 may be configured in various structures within a range, which has the suction port 101.

In an embodiment, the suction nozzle 10 may be configured to include a nozzle housing 11 and a connection neck 300.

Further, the suction nozzle 10 is configured to include a rotating cleaner 400.

The nozzle housing 11 may be configured to be placed on a bottom and to move along the bottom surface B. In this case, the suction port 101 may be formed on a lower surface of the nozzle housing 11.

For smooth movement of the nozzle housing 11 placed on the bottom surface, a plurality of wheels (casters 180) may be formed on the lower surface of the nozzle housing 11.

The nozzle housing 11 may be configured to include a nozzle head unit 100 and a nozzle neck unit 200. The nozzle head unit 100 may form a front portion in the nozzle housing 11, and the nozzle neck unit 200 may form a rear portion in the nozzle head unit 100.

The suction port 101 may be formed on the lower surface of the nozzle head unit 100.

The nozzle neck unit 200 is configured in the form of the pipe, and extended in a rear direction in the rear of the nozzle head unit 100. In the nozzle housing 11, the nozzle neck unit 200 is a portion coupled to the connection neck 300, and the nozzle neck unit 200 may be coupled to the connection network 300 to be rotatable with each other.

The rotating cleaner 400 is provide din the suction nozzle 10. The rotating cleaner 400 is configured substantially in a roll form, and coupled to the nozzle housing 11 (nozzle head unit 100) to be rotatable based on a central axis (first rotary axis R1). The rotating cleaner 400 may be coupled to the lower surface of the nozzle housing 11 (nozzle head unit 100) in front of the suction port 101 (see FIG. 1).

The motor (second motor 470) may be provided inside the suction nozzle 10 for rotation of the rotating cleaner 400.

A fluffy 420 configured to include a brush and/or cotton flannel is formed on the outer peripheral surface of the rotating cleaner 400. The fluffy 420 of the rotating cleaner 400 may be disposed to be in contact with the bottom surface B or to be very close to the bottom surface B, and may sweep or adsorb the dust on the bottom toward the suction port 101 while the rotating cleaner 400 rotates.

A first flow path 430 having a concave groove form is formed on the outer peripheral surface of the rotating cleaner 400. The first flow path 430 forms a passage in which the air and/or foreign substances move. In particular, the first flow path 430 forms a passage in which the foreign substances located on the front bottom surface B move to the suction port 101 located in the rear of the rotating cleaner 400.

The connection neck 300 is a portion coupled in the connection pipe 20 in the suction nozzle 10. The connection neck 300 is detachably coupled to the first connection unit 21. The connection neck 300 may be configured in the form of the pipe, and the inside of the connection neck 300 is in communication with the suction port 101, and is in communication with the inside of the connection pipe 20.

A button 310 for separation from the connection pipe 20 coupled to the connection neck 300 may be provided in the connection neck 300.

The dust introduced into the suction port 101 may move toward the connection pipe 20 through the inside of the nozzle neck unit 200 and the inside of the connection neck 300 in the suction nozzle 10. A separate corrugated pipe 170 may be inserted into the nozzle housing 11 (in particular, nozzle neck unit 200) and the connection neck 300, and when the corrugated pipe 170 is provided, the dust introduced into the suction port 101 moves toward the connection pipe 20 through the inside of the corrugated pipe 170.

The connection neck 300 may form a rear portion of the suction nozzle 10, and may be formed in the rear of the nozzle housing 11.

As described above, the nozzle housing 11 (nozzle neck unit 200) and the connection neck 300 are rotatably coupled to each other. The nozzle housing 11 (nozzle neck unit 200) and the connection neck 300 are rotatably coupled to each other based on a second rotary axis R2. The second rotary axis R2 may be configured to be parallel to the bottom surface B.

Figure 7:
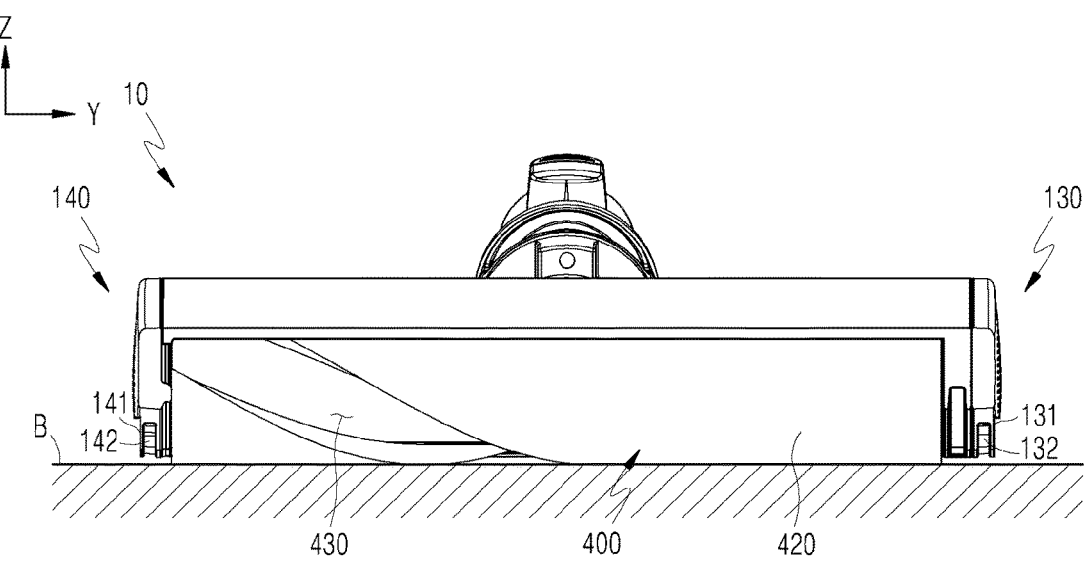
FIG. 7 is a diagram illustrating the suction nozzle viewed from the front.

FIG. 7 is a diagram illustrating the suction nozzle 10 viewed from the front.

Figure 8:
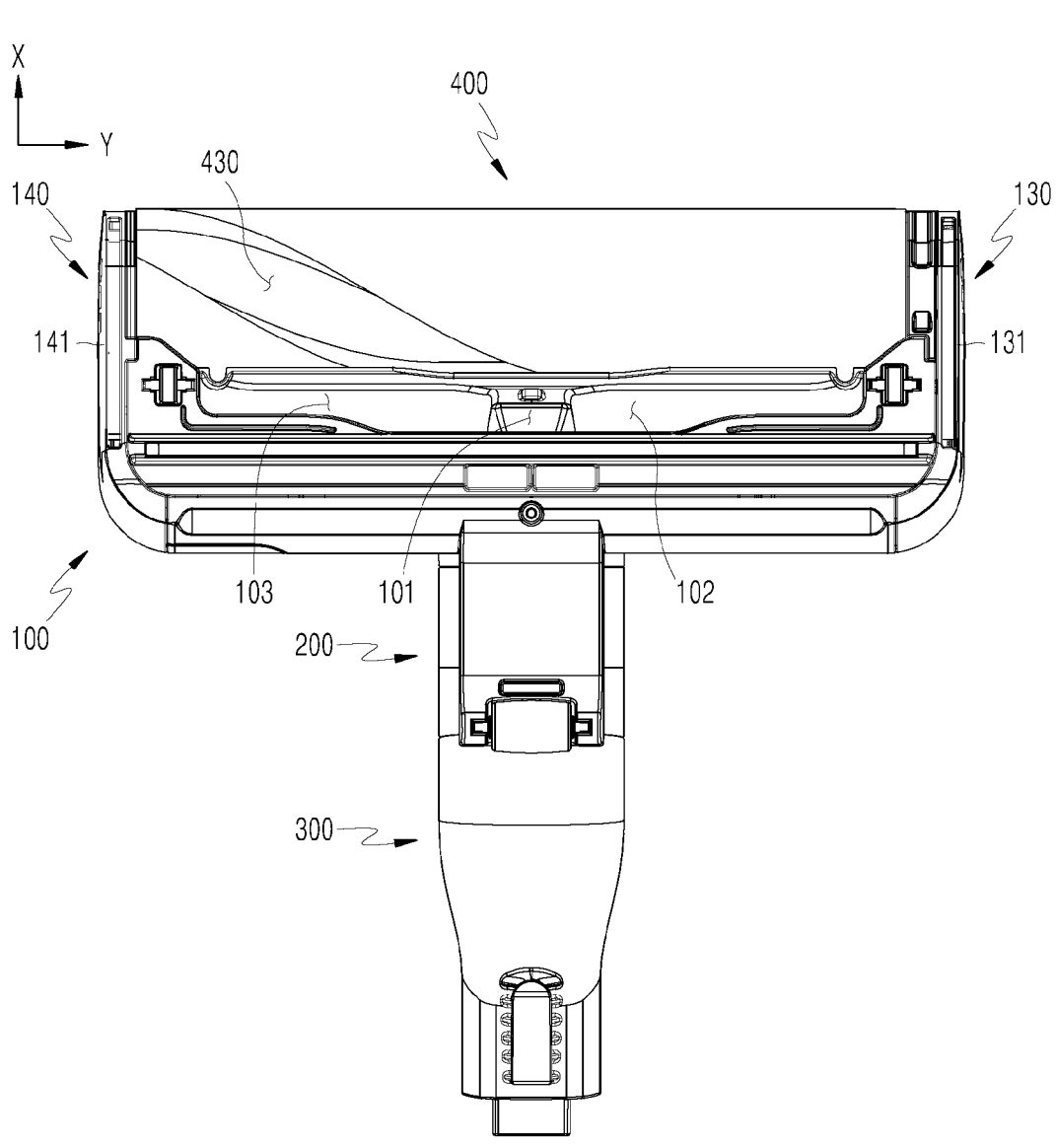
FIG. 8 is a diagram illustrating the suction nozzle viewed from the bottom.

FIG. 8 is a diagram illustrating the suction nozzle 10 viewed from the bottom.

The nozzle head unit 100 is configured to include an upper housing 110, a lower housing 120, a first side wall 130, a second side wall 140, and an internal wall 150.

The nozzle head unit 100 may be configured in the left-right symmetrical form.

The upper housing 110 includes an upper cover 111.

The upper cover 111 is configured to elongate in the second direction Y. A length of the upper cover 111 is a little larger than the length of the rotating cleaner 400 in the second direction Y.

The cross section of the upper cover 111 may be configured to be constant. An inner surface of the upper cover 111 may be configured to be concave, and may be configured to have a curvature which corresponds to (is the same as or similar to) the curvature of an outer surface of the rotating cleaner 400.

The upper cover 111 is located above the rotating cleaner 400. The inner surface of the upper cover 111 may be in contact with the outer surface of the rotating cleaner 400 or the inner surface of the upper cover 111 may be spaced with a small gap from the outer surface 400 of the rotating cleaner 400.

A front corner 111a of the upper cover 111 may be configured in a straight form in the second direction Y. That is, the front corner 111a of the upper cover 111 may be configured to be parallel to the second direction Y (or the first rotary axis R1).

Based on the front-rear direction (first direction X), the front corner 111a of the upper cover 111 may have the same phase as a front end of the rotating cleaner 400, or may be located in the rear of the front end of the rotating cleaner 400 or in front of the front end of the rotating cleaner 400.

The upper housing 110 may be configured to include a rear cover 112.

In the upper housing 110, when the upper cover 111 forms a front portion, the rear cover 112 forms a rear portion.

The rear cover 112 is coupled to the rear side of the upper cover 111. The rear cover 112 may be configured to elongate in the second direction Y, and a length of the rear cover 112 may be configured to be the same as or similar to the length of the upper cover 111 in the second direction Y.

The rear cover 112 forms a portion fixedly connected to the nozzle neck unit 200 in the upper housing 110.

The lower housing 120 is configured to elongate substantially in the second direction Y. A length of the lower housing 120 is configured to be a little larger than the length of the rotating cleaner 400 in the second direction Y.

The lower housing 120 forms the lower surface of the nozzle head unit 100, and forms the lower surface of the nozzle housing 11.

The lower housing 120 is fixed to the upper housing 110 while being located below the upper housing 110.

The lower housing 120 is located in the rear of the rotating cleaner 400. The suction port 101 is provided between the lower housing 120 and the rotating cleaner 400 while the lower housing 120 is fixed to the upper housing 110. That is, the suction port 101 is provided in the front portion of the lower housing 120. In particular, the suction port 101 is provided at a left-right-direction center of the lower housing 120.

The first side wall 130 is configured to shield one side surface of the rotating cleaner 400, and fixedly coupled to the upper housing 110 and the lower housing 120.

The second side wall 140 shields a side surface of the rotating cleaner 400 at an opposite side to the first side wall 130, and is fixedly coupled to the upper housing 110 and the lower housing 120.

When the first side wall 130 forms a left surface of the nozzle head unit 100, the second side wall 140 forms a right surface of the nozzle head unit 100.

The first side wall 130 is configured to include a first inclination unit 132. The first inclination unit 132 may form a front lower corner of the first side wall 130, and may be configured to be inclined or configured in a curve form. The first inclination unit 132 may be configured to face the rear side as facing the lower side.

The second side wall 140 is configured to include a second inclination unit 142. The second inclination unit 142 may form the front lower corner of the second side wall 140, and may be configured to be inclined or configured in the curve form. The second inclination unit 142 may be configured to face the rear side as facing the lower side.

In an embodiment, the second flow path 131 is formed in the first side wall 130 and a third flow path 141 is formed in the second side wall 140.

The second flow path 131 may be provided while a part is stepped inward on the outer surface of the first side wall 130. That is, the outer surface of the first side wall 130 is configured in a form which is concave inward in a portion where the second flow path 131 is formed.

The second flow path 131 may be formed throughout an entire interval of the front-rear direction (first direction X) in the first side wall 130. The second flow path 131 is connected up to the first inclination unit 132.

As a result, when the first side wall 130 is in close contact with an indoor wall surface, the first side wall 130 is spaced apart from the indoor wall surface at a point where the second flow path 131 is at least formed, and the air of the outside and the inside of the suction nozzle may be communicated through the second flow path 131.

The first flow path 430 may be formed at a lower end of the first side wall 130, and to this end, a lower end portion of the first side wall 130 is configured in a form which is stepped inward.

The third flow path 141 may be provided while a part is stepped inward on the outer surface of the second side wall 140. That is, the outer surface of the second side wall 140 is configured in a form which is concave inward in a portion where the third flow path 141 is formed.

The third flow path 141 may be formed throughout the entire interval of the front-rear direction (first direction X) in the second side wall 140. The third flow path 141 is connected up to the second inclination unit 142.

As a result, when the second side wall 140 is in close contact with the indoor wall surface, the second side wall 140 is spaced apart from the indoor wall surface at a point where the third flow path 141 is at least formed, and the air of the outside and the inside of the suction nozzle may be communicated through the second flow path 141.

The third flow path 141 may be formed at the lower end of the second side wall 140, and to this end, the lower end portion of the second side wall 140 is configured in the form which is stepped inward.

An internal wall 150 is substantially provided inside the nozzle head unit 100. The internal wall 150 is configured to elongate in the second direction Y which is a direction parallel to the first rotary axis R1. A front surface of the internal wall 150 forms a flat or curved surface. The front surface of the internal wall 150 may be in contact with the outer surface of the rotating cleaner 400 in the rear of the rotating cleaner 400.

An upper-end corner 152 of the internal wall 150 is coupled and fixed to the lower surface of the upper housing 110.

A lower-end corner 151 of the internal wall 150 is configured to be higher than the lower end of the rotating cleaner 400. That is, while the suction nozzle 10 is placed on the bottom surface B, the internal wall 150 is configured not to shield a space between the rotating cleaner 400 and the suction port 101, and a space where the rotating cleaner 400 is located, and the suction port 101 are configured to communicate with each other through the lower end of the internal wall 150.

In an embodiment, a lower-end corner 151 of the internal wall 150 may be configured to be lower than the first rotary axis R1.

In an embodiment, a first derivation flow path 102 and a second derivation flow path 103 are provided in the nozzle head unit 100.

The first derivation flow path 102 forms a space which extends in a direction parallel to the first rotary axis R1 in the suction port 101. The second derivation flow path 103 forms a space which extends in a direction opposite to the first flow path 102 in the suction port 101. That is, the first derivation flow path 102 and the second derivation flow path 103 are formed at opposite sides to each other around the suction port 101. When the first derivation flow path 102 is provided at a left side of the suction port 101, the second derivation flow path 103 is provided at a right side of the suction port 101.

The first derivation flow path 102 and the second derivation flow path 103 form a route for guiding the foreign substances to move to the suction port 101.

The first derivation flow path 102 and the second derivation flow path 103 may be configured by the lower housing 120 and the internal wall 150. A front surface of the lower housing 120 may form rear wall surfaces of the first derivation flow path 102 and the second derivation flow path 103, and a lower surface of a rear portion of the internal wall 150 may form upper wall surfaces of the first derivation flow path 102 and the second derivation flow path 103.

Based on the second direction Y, the first derivation flow path 102 and the second derivation flow path 130 have sufficient lengths to derive the foreign substances into the suction port 101. To this end. based on the second direction Y, the length of the first derivation flow path 102 may be ¼ or more of the length of the rotating cleaner 400, or ⅓ or more. To this end. based on the second direction Y, the length of the first derivation flow path 103 may be ⅔ or more of the length of the rotating cleaner 400, or ⅓ or more.

In an embodiment, the rear side of the rotating cleaner 400 is exposed to the suction port 101, the first derivation flow path 102, and the second derivation flow path 103 in a region lower than the first rotary axis R1.

In an embodiment, based on the second direction Y, a total length of the first derivation flow path 102, the suction port 101, and the second derivation flow path 103 may be equal to or larger than the length of the rotating cleaner 400.

In another embodiment, based on the second direction Y, the total length of the first derivation flow path 102, the suction port 101, and the second derivation flow path 103 may be a littler smaller than the length of the rotating cleaner 400.

FIG. 9 is a diagram illustrating a rotating cleaner 400.

FIG. 10*a* is a diagram illustrating a core 410 of the rotating cleaner 400.

Each of FIGS. 10*b* and 10*c* is a diagram illustrating a view in which an outer peripheral surface layer 415 constituting the rotating cleaner 400 is unfolded.

FIG. 10*d* is a diagram illustrating a cross section of the outer peripheral surface layer 415 of FIG. 10*c*.

FIG. 11*a* illustrates a cross section in B-B' of FIG. 9, FIG. 11*b* illustrates a cross section in C-C' of FIG. 9, and FIG. 11*c* illustrates a cross section in D-D' of FIG. 9.

FIG. 12*a* is a diagram illustrating the rotating cleaner 400 according to an embodiment and FIG. 12*b* is a side view illustrating the rotating cleaner 400 of FIG. 12*a*.

The rotating cleaner 400 is rotatably coupled to the nozzle head unit 100 based on the first rotary axis R1 parallel to the left-right direction. The rotating cleaner 400 is located in front of the suction port 101.

The rotating cleaner 400 is configured to include a core 410, a fluffy 420, and a first flow path 430.

The core 410 is configured in a cylindrical shape having the first rotary axis R1 as a central axis. The cross section (outer peripheral surface) of the core 410 may be configured to be constant in the second direction Y.

The core 410 may be made of a comparatively hard material, and the core 410 may be configured to include a plastic and/or metallic material.

The fluffy 42 is coupled to the outer peripheral surface of the core 410 to contact the bottom surface.

The fluffy 420 may be made of a sufficiently soft and fluffy material as compared with the core 410. When the rotating cleaner 400 rotates in contact with the bottom surface, the form of the core 410 may be maintained, and the form of the fluffy 420 may be transformed while the fluffy 420 contacts the bottom surface.

The fluffy 420 is configured to include at least one of a brush and a textile.

The 'textile' described in the embodiment of the present invention means a product made of a fiber as a raw material. The textile may include materials such as a thread type, fabric, knitting, lace, netting, felt, cotton, paper, etc., and products made of the materials.

The brush described in the embodiment of the present invention may be configured in a form and a material such as the general brush. The brush may be configured by a combination of bristles, a combination of short threads, a combination of fibers, a combination of thin cords, a combination of filaments, or a combination of thin pins. The 'fiber' described below may be replaced with the bristle, the thread, the cord, the filament, and/or the pin except for a case in which the fiber is particularly limited.

The fluffy 420 may be configured by the brush or configured by the textile, or configured by a combination of the brush and the textile.

In an embodiment, the fluffy 420 may be made of flannel.

When the fluffy 420 is configured by the brush, each fiber 421 constituting the fluffy 420 (brush) is configured in a form to protrude in a radial direction on the outer peripheral surface of the core 410.

In the fluffy 420, each fiber 421 may be configured in a form in which each filter 421 is tightly planted. In an embodiment, each fiber 421 may be tightly planted enough for at least a part of each fiber to contact other adjacent fibers 421. In another embodiment, an interval between the fibers 421 may be tightly planted enough to be equal to or smaller than a diameter of each fiber 421.

The diameter of each fiber 421 constituting the fluffy 420 (brush) may be variously configured. For example, the diameter of the fiber 421 constituting the fluffy 420 may be configured in various sizes from several lams to hundreds of lams.

The fluffy 420 is configured to have a predetermined thickness (a radial thickness of the rotating cleaner 400). The fluffy 420 may be configured to have a predetermined thickness range throughout the entire region.

The first flow path 430 forms a space as a concave groove (valley) on the outer peripheral surface of the rotating cleaner 400.

The first flow path 430 forms a space which crosses the fluffy 420.

The first flow path 430 may be a space in which the fiber 421 constituting the fluffy 420 is excluded.

In the embodiment of the present invention, the entirety of the outer peripheral surface of the rotating cleaner 400 may be covered with the fluffy 420 except for the first flow path 430. That is, in a configuration constituting the outer peripheral surface of the rotating cleaner 400, only the first flow path 430 and the fluffy 420 may be present.

The first flow path 430 may be formed from a left end up to a right end of the rotating cleaner 400.

A longitudinal direction of the first flow path 430 may be configured to be inclined to the first rotary axis R1. In an embodiment, the first flow path 430 may be configured in a spiral shape. That is, the first flow path 430 may have the spiral shape around the first rotary axis R1.

In the rotating cleaner 400 according to the embodiment of the present invention, the first flow path 430 is configured by one line. That is, all first flow paths 430 formed on the outer peripheral surface of the rotating cleaner 400 are configured in a form such as one line with parts from not being separated.

The first flow path 430 includes a first boundary surface 431 and a second boundary surface 432.

The first boundary surface 431 is a surface that forms a boundary of the first flow path 430 and the fluffy 420. The first boundary surface 431 is configured in the spiral shape.

The second boundary surface 432 is a surface that forms the boundary of the fluffy 420 with the first flow path 430 at an opposite side to the first boundary surface 431. The second boundary surface 432 is also configured in the spiral shape.

The second boundary surface 432 is located behind the first boundary surface 421 based on a rotational direction of the rotating cleaner 400.

In the embodiment of the present invention, the rotating cleaner 400 may be configured to rotate in a form to roll toward the front side of the suction nozzle 10. When viewed at a left side of the suction nozzle 10, the rotating cleaner 400 may be configured to rotate a counterclockwise direction, and when viewed at a right side of the suction nozzle 10, the rotating cleaner 400 may be configured to rotate a clockwise direction.

The rotation of the rotating cleaner 400 may rapidly move foreign substances located on a front bottom surface of the rotating cleaner 400 to a rear space (in particular, the suction port 101) of the rotating cleaner 400.

In an embodiment, when viewed on a transverse cross section of the rotating cleaner 400, the first boundary surface 431 and the second boundary surface 432 are configured to be vertically to the outer peripheral surface of the core 410. That is, on the transverse cross section of the rotating cleaner 400, the first boundary surface 431 and the second boundary surface 432 are formed in the radial direction of the rotating cleaner 400.

The first boundary surface 431 and the second boundary surface 432 are configured as such, so when a suction force (or negative pressure) is applied along the first flow path 430, the suction force (or negative pressure) may be intensively applied only on the first flow path 430 without departing from the first flow path 430, and further, the foreign substances which move through the first flow path 430 may rapidly and effectively move along a route formed by the first flow path 430.

The rotating cleaner 400 of the vacuum cleaner 1 according to the embodiment of the present invention may be configured to have a size, a form, etc., suitable for adsorption and transfer of the foreign substances, and further, the first flow path 430 of the rotating cleaner 400 as a passage through which the suction force (or negative pressure) is applied and the foreign substances move needs to be configured to have a most suitable size, form, etc.

By considering such a point, in the embodiment of the present invention, an internal between an inner end (a part closest to the core 410) and of the first boundary surface 431 and an inner end (a part closest to the core 410) of the second boundary surface 432 may be configured to be three times larger and four times smaller than a height of the first boundary surface 431.

In addition, an outer diameter of the core 410 may be configured in a range of 35 to 40 mm, and a length may be configured in a range of 210 to 230 mm. In an embodiment, the outer diameter of the core 410 may be configured to be approximately 38 mm, and the length may be configured to be approximately 2222 mm.

Further, a width (inner width, d3) of the first flow path 430 may be configured in a range of 15 to 25 mm, and a depth d4 may be configured in a range of 3 to 7 mm. In an embodiment, the width (inner width, d3) of the first flow path 430 may be configured to be approximately 31 mm, and the depth d4 may be configured to be approximately 6 mm.

When the width d3 and the depth d4 of the first flow path 430 are too large, the area of the fluffy 420 is relatively reduced, and adsorption and transfer of dust by the fluffy 420 may deteriorate and the suction force may be intensively applied on the first flow path 430. Further, when the width and the depth of the first flow path 430 are too small, it may be difficult to transfer the foreign substances through the first flow path 430 or too much time may be required for cleaning. In the embodiment of the present invention, the first flow path 430 is configured as described above to resolve the problem.

The width and the depth of the first flow path 430 may be configured to be constant in the longitudinal direction thereof.

As described above, the first flow path 430, and the first boundary surface 431 and the second boundary surface 432 which are both surfaces of the first flow path 430 may be configured in the spiral shape. In the embodiment of the present invention, the first flow path 430 may be configured in the spiral shape of a form in which the rotating cleaner 400 rotates once, or configured in the spiral shape of a form in which the rotating cleaner 400 slightly less than once, and hereinafter, this will be described.

In an embodiment, an angle between a first normal plane S1 which meets a front end of the first boundary surface 431 on a normal plane of the outer peripheral surface of the rotating cleaner 400 and a second normal plane S2 which meets a rear end of the second boundary surface 432 on the normal plane of the outer peripheral surface of the rotating cleaner 400 may be configured to be 0 to 45° (see FIGS. 12a and 12b).

The first boundary surface 431 includes a first front end portion 431a and a first rear end portion 431b constituting both end portions. The first front end portion 431a is a part that forms the front end of the first boundary surface 421 based on the rotational direction of the rotating cleaner 400. The first rear end portion 431ba is a part that forms the rear end of the first boundary surface 421 based on the rotational direction of the rotating cleaner 400.

The second boundary surface 432 includes a second front end portion 432a and a second rear end portion 432b constituting both end portions. The second front end portion 432a is a part that forms the front end of the second boundary surface 432 based on the rotational direction of the rotating cleaner 400. The second rear end portion 432b is a part that forms the rear end of the second boundary surface 432 based on the rotational direction of the rotating cleaner 400.

A reference line RL connecting the first front end portion 431a and the second rear end portion 432b may be configured to be parallel to the first rotary axis R1 (see FIG. 9).

The rotating cleaner 400 may be configured by coupling an outer peripheral surface layer 415 to the outer peripheral surface of the core 410. Before being coupled to the core 410, the outer peripheral surface layer 415 may be unfolded flat.

The outer peripheral surface layer 415 may be constituted by a base region 417 and a fluffy region 420' coupled to be fixed to the base region 417.

The base region 417 may be configured in the form of a thin cloth or net, or a film. The area of the base region 417 may be configured to correspond to (to be the same as or similar to) the area of the outer peripheral surface of the core 410.

The fluffy region 420' forms the fluffy 420.

The fluffy region 420' is configured by the fiber 421, and formed on an outer surface of the base region 417. The fluffy region 420' may be configured integrally with the base region 417, or configured separately from the base region 417, and then fixedly coupled to the base region 417.

The outer peripheral surface layer 415 may be configured to include a first flow path region 430' forming the first flow path 430. The first flow path region 430' may be a region (space) in which the fluffy region 420' is not formed outside the base region 417.

The outer peripheral surface layer 415 forms the first flow path 430 with the fluffy 420 while an inner surface of the base region 417 is fixedly coupled to the outer peripheral surface of the core 410.

In an embodiment, the outer peripheral surface layer 415 may be configured in a form that does not include the first flow path region 430', and includes only the fluffy region 420', or includes only the base region 417 and the fluffy region 420'.

In an embodiment, the outer peripheral surface layer 415 which is unfolded flat may be configured in a rectangular form. In this case, a length of a horizontal wide of the outer peripheral surface layer 415 may be configured to be equal to a length d2 of the rotating cleaner 400, and a length of a vertical side of the outer peripheral surface layer 415 may be configured to be equal to a circumferential length d1 of the outer peripheral surface of the core 410.

When the outer peripheral surface layer 415 is coupled to the outer peripheral surface of the core 410, the outer peripheral surface layer 415 may form the first flow path 430 with the fluffy 420 while a bottom horizontal side E1 and a top horizontal side E2 of the outer peripheral surface layer 415 are coupled to be in contact with each other.

Again, when the first flow path region 430' is configured in one straight line form in the outer peripheral surface layer 415 configured in the rectangular form, the first flow path region 430' is configured in a form that crosses the outer peripheral surface layer 415 in a diagonal direction.

As a result, the fluffy region 420' is divided into two regions around the first flow path region 430'. That is, the fluffy region 420' is divided into a triangular first fluffy region 420*a* and the other triangular second fluffy region 420*b* (see FIG. 10*b*).

In another embodiment, the outer peripheral surface layer 415 which is unfolded flat may be configured in a parallelogram form. In this case, a length of one side of the outer peripheral surface layer 415 which is relatively long may be configured to be equal to a length of the first flow path 430 (the length of the first flow path region 430'), and a length of the other side of the outer peripheral surface layer 415 which is relatively short may be configured to be equal to the circumferential length d1 of the outer peripheral surface of the core 410. When the outer peripheral surface layer 415 is coupled to the outer peripheral surface of the core 410, the outer peripheral surface layer 415 may form the first flow path 430 with the fluffy 420 while two sides E3 and E4 which are relatively long are coupled to be in contact with each other.

Further, in this case, the first flow path region 430' may be formed along one corner of the fluffy region 420'. That is, the fluffy region 420' may be configured in one parallelogram form and while the first flow path region 430' is also configured in one long parallelogram form, the first flow path region 430' may be formed at an edge of the fluffy region 420'.

Therefore, when the outer peripheral surface layer 415 is configured in the parallelogram form, the fluffy region 420' may be configured by one region, so the fluffy region 420' is advantageous for manufacturing the outer peripheral surface layer 415, and when the outer surface layer 415 is coupled to the core 410, a problem such as the fluffy 420 being partially separated or partially overlapped may be prevented.

Each of (a), (b), (c), (d), (e), (f), (g), and (h) of FIG. 13 is a diagram schematically illustrating a view in which the rotating cleaner 400 rotates in a state of touching a floor surface B and a front wall surface W1.

Each of (a), (b), (c), and (d) of FIG. 14 as a diagram illustrating the suction nozzle 10 touching the front wall surface viewed from the bottom is a diagram schematically illustrating a direction and a route in which air moves.

When the rotating cleaner 400 is viewed in the second direction Y, the first boundary surface 431 is illustrated in a form projected in the second direction Y, and in this case, the first boundary surface 431 is configured substantially in a circular form. However, the first boundary surface 431 does not form a perfect circle, and the first front end portion 431*a* and the first rear end portion 431*b* which are both end portions of the first boundary surface 431 form circles in a form of being slightly spaced apart from each other.

Further, when the rotating cleaner 400 is viewed in the second direction Y, the second boundary surface 432 is illustrated in the form projected in the second direction Y, and in this case, the second boundary surface 432 is configured substantially in the circular form. However, the second boundary surface 432 does not form the perfect circle, and the second front end portion 432*a* and the second rear end portion 432*b* which are both end portions of the second boundary surface 432 form circles in the form of being slightly spaced apart from each other.

However, when the rotating cleaner 400 is viewed in the second direction Y, the first front end portion 431*a* and the second rear end portion 432*b* may be formed at a point where the first front end portion 431*a* and the second rear end portion 432*b* match each other.

A lower end of the rotating cleaner 400 is in contact with the bottom surface in the second direction Y, and a first space A1 which is a space of a part just above a front bottom of the rotating cleaner 400 and a second space A2 which is a space of a part just above a rear bottom of the rotating cleaner 400 are in a form blocked by the rotating cleaner 400. The second space A2 corresponds to a space where the suction port 101, the first derivation flow path 102, and the second derivation flow path 103 are located.

When the suction nozzle 10 advances forward, the rotating cleaner 400 advances jointly with the suction nozzle 10 while rolling and rotating forward, and as a result, the foreign substances of the first space A1 may be adsorbed on the outer peripheral surface of the rotating cleaner 400 or swept to move toward the second space A2, and sucked into the suction port 101.

The vacuum cleaner 1 will also be configured to suction the foreign substances such as dust accumulated in a bottom corner of the wall surface. That is, even when the suction nozzle 10 touches the front wall surface and does not advance any longer, the foreign substances of the first space A1 should move toward the second space A2, and then be sucked into the suction port 101.

Since the first flow path 430 is formed on the outer peripheral surface of the rotating cleaner 400 according to the embodiment of the present invention, the first space A1 and the second space A2 are in effective communication with each other through the first flow path 430, and as a result, the suction force (or negative pressure) of the second space A2 is excellent transferred to the first space A1, and the foreign substances located in the first space A1 excellently move toward the second space A2.

Hereinafter, this will be described.

When the suction nozzle 10 is in close contact with a front wall surface W1, the suction force (or negative pressure) which acts at the suction port 101 is primarily transferred to the first space A1 through the first flow path 430, and in this case, by the negative pressure formed on the first space A1, external air is introduced into the center from both left and right sides (the first inclination unit 132 and the second inclination unit 142) of the first space A1. Smooth introduction of the external air into the first space A1 helps the action of the suction force (negative pressure) on the first flow path 430.

As described above, an internal wall 150 may be in close contact with a rear surface of the rotating cleaner 400.

When the second rear end portion 432b is located at a rearmost side of the rotating cleaner 400, a line connecting the second rear end portion 432b on the first rotary axis R1 is configured to be parallel to a horizontal direction, and the second front end portion 432a is located behind the rotating cleaner 400 at a lower point than the second rear end portion 432b (see (a) of FIG. 13). The second rear end portion 432b may be located to be higher than the bottom of the internal wall 150, and the second front end portion 432a may be located to be lower than the bottom of the internal wall 150, and in this case, the suction force formed at the suction port 101 may be transferred to the first flow path 430 at a lower part, and the foreign substances of the first space A1 may be moved to the second space A2 and sucked into the suction port 101. That is, an acting direction of the suction force in the first flow path 430 coincides with the rotational direction of the rotating cleaner 400.

The rotating cleaner 400 rotates (rotates in the counterclockwise direction), and in all of a case where the second rear end portion 432b rotates at 45° in the counterclockwise direction (see (b) of FIG. 13), a case where the second rear end portion 432b rotates at 90° (see (c) of FIG. 13), a case where the second rear end portion 432b rotates at 135° (see (d) of FIG. 13), and a case where when the second rear end portion 432b rotates at 180° (see (e) of FIG. 13), the suction force formed at the suction port 101 may be transferred to the first flow path 430 at the lower part, and the foreign substances of the first space A1 may be moved to the second space A2 and sucked into the suction port 101 through the first flow path 430. That is, the acting direction of the suction force in the first flow path 430 coincides with the rotational direction of the rotating cleaner 400.

In a case where the rotating cleaner 400 further rotates (rotates in the counterclockwise direction) and the second rear end portion 432b rotates at 225° (see (f) of FIG. 13), a part of the suction force formed at the suction port 101 is transferred to the first flow path 430 at the lower part, and the other part of the suction force formed at the suction port 101 is transferred to the first flow path at an upper part.

In this case, a part of the acting direction of the suction force in the first flow path 430 coincides with the rotational direction of the rotating cleaner 400, and the other part is opposite to the rotational direction of the rotating cleaner 400. That is, partial switching is made in the direction in which the suction force acts.

In a case where the rotating cleaner 400 further rotates (rotates in the counterclockwise direction) and the second rear end portion 432b rotates at 225° (see (g) of FIG. 13), the second rear end portion 432b touches the bottom surface, and the suction force formed at the suction port 101 is not transferred to the first flow path 430 at the lower part, but transferred to the first flow path at the upper part. That is, the acting direction of the suction force in the first flow path 430 is opposite to the rotational direction of the rotating cleaner 400.

In a case where the rotating cleaner 400 further rotates (rotates in the counterclockwise direction) and the second rear end portion 432b rotates at 315° (see (h) of FIG. 13), a part of the suction force formed at the suction port 101 is transferred to the first flow path 430 at the lower part, and the other part of the suction force formed at the suction port 101 is transferred to the first flow path at the upper part.

That is, a part of the acting direction of the suction force in the first flow path 430 coincides with the rotational direction of the rotating cleaner 400, and the other part is opposite to the rotational direction of the rotating cleaner 400.

As such, by the vacuum cleaner 1 and the rotating cleaner 400 according to the embodiment of the present invention, the first space A1 and the second space A2 are in communication with each other through the first flow path 430 at all rotational angles of the rotating cleaner 400, so the foreign substances of the first space A1 may be effectively and rapidly sucked into the suction port 101.

Further, the direction in which the suction force acts in the first flow path 430 is switched in a partial rotational section of the rotating cleaner 400. As a result, the suction force may act in different directions in the first space A1, and turbulence may be frequently generated in the first space A1, and the motility of the dust in the first space may be increased. According to such a feature, the foreign substances of the first space A1 may be more rapidly and effectively introduced into the suction port 101 through the first flow path 430.

Each of (a), (b), (c), and (d) of FIG. 15 as a diagram illustrating the suction nozzle 10 touching the front wall surface W1 and the left wall surface W2 viewed from the bottom is a diagram schematically illustrating a direction and a route in which air moves.

Each of (a), (b), (c), and (d) of FIG. 16 as a diagram illustrating the suction nozzle 10 touching the front wall surface W1 and the right wall surface W3 viewed from the bottom is a diagram schematically illustrating a direction and a route in which air moves.

When the suction nozzle 10 is in close contact with the front wall surface W1 and the left wall surface W2, the suction force (or negative pressure) which acts at the suction port 101 is primarily transferred to the first space A1 through the first flow path 430, and in this case, by the negative pressure formed on the first space A1, external air is introduced into the center from both left and right sides of the first space A1.

The external air is introduced into the first space A1 through the second flow path 131 and the first inclination unit 132 at the left side of the suction nozzle 10, and the external air is introduced into the first space A1 through the second inclination unit 132 at the right side of the suction nozzle 10.

In particular, the external air introduced through the second flow path 131 and the first inclination unit 132 at the left side of the suction nozzle 10 increases the fluidity (motility) of the foreign substances located at a left corner (a corner formed by the front wall surface, the left wall surface, and the bottom surface) of the first space A1, and helps the foreign substances be sucked through the first flow path 430.

When the suction nozzle 10 is in close contact with the front wall surface W1 and the right wall surface W3, the suction force (or negative pressure) which acts at the suction port 101 is primarily transferred to the first space A1 through the first flow path 430, and in this case, by the negative pressure formed on the first space A1, the external air is introduced into the center from both left and right sides of the first space A1.

The external air is introduced into the first space A1 through the third flow path 141 and the second inclination unit 142 at the right side of the suction nozzle 10, and the external air is introduced into the first space A1 through the first inclination unit 132 at the left side of the suction nozzle 10.

In particular, the external air introduced through the third flow path 141 and the second inclination unit 142 at the right side of the suction nozzle 10 increases the fluidity (motility) of the foreign substances located at a right corner (the corner formed by the front wall surface, the left wall surface, and the bottom surface) of the first space A1, and helps the foreign substances be sucked through the first flow path 430.

Smooth introduction of the external air into the first space A1 helps the action of the suction force (negative pressure) on the first flow path 430.

FIG. 17 as a side view of the suction nozzle 10 is a diagram schematically illustrating a view in which the front wall surface is sensed by a distance sensor 500.

Each of FIGS. 18a, 18b, and 18c as a diagram illustrating the suction nozzle 10 from the top is a diagram schematically illustrating a view in which the front wall surface is sensed by the distance sensor 500.

In an embodiment, the vacuum cleaner 1 is configured to include the distance sensor 500.

The distance sensor 500 is coupled to the suction nozzle 10 to sense a distance from the wall surface located in front of the suction nozzle 10.

The distance sensor 500 is formed in the suction nozzle 10 to sense a relative distance from an object (e.g., the wall surface) located in front of the suction nozzle 10. The distance sensor 500 may be variously configured within a range to sense a relative distance between a point where the distance sensor 500 is formed and the wall surface.

The distance sensor 500 may be configured as the optical sensor, or configured as the infrared sensor, and may be a distance sensor such as a LiDAR sensor. For example, the distance sensor 500 may be configured to emit electromagnetic energy (e.g., visible rays, infrared or radio wave), and detect reflection of the emitted energy.

The distance sensor 500 may be configured to include a light emitting unit irradiating light and a light receiving unit on which the reflected light is incident. The distance sensor 500 may be configured as a ToF sensor.

The distance sensor 500 senses a distance d5 (may be a distance in a horizontal distance from the wall surface or a distance in an inclination direction from the wall surface) from the distance sensor 500 up to the wall surface W1.

In an embodiment, a rotational speed of the first motor 31 is configured to increase when a distance value sensed by the distance sensor 500 is equal to or less than a reference value.

The distance value sensed by the distance sensor 500 is transmitted to a control unit 38, and the control unit 38 controls the rotational speed of the first motor 31 according to the distance value and the reference value. The control unit 38 may control the first motor 31 so that the rotational speed of the first motor 31 increases when the distance value sensed by the distance sensor 500 is equal to or smaller than the reference value. For example, when the distance value is equal to or less than the reference value, the control unit 38 may immediately control the rotational speed of the first motor 31 by 50% or control the rotational speed to double.

In the embodiment of the present invention, when the distance value is larger than the reference value, i.e., when the power W is 40 W in a normal usage state of the vacuum cleaner 1, the power of the vacuum cleaner may be configured to be 60 W by the increase of the rotational speed of the first motor 31 when the distance value is equal or less than the reference value.

In the embodiment of the present invention, the distance sensor 500 accurately measures the relative distance from the front wall surface W1, and a forming position of the distance sensor 500 is determined so as to comparatively accurately predict a movement time and a movement distance of the suction nozzle 10 until the suction nozzle 10 touches the front wall and is stopped to move after the distance sensor 500 senses the front wall surface W1.

When the first rotary axis R1 is parallel to the front wall surface W1, the distance from the front wall sensed by the distance sensor 500 may be equal or similar in the entire section of the suction nozzle 10 in the second direction Y.

When the first rotary axis R1 is not parallel to the front wall surface W1, for example, when the first side wall 130 is located closer to the front wall than the second side wall, the distance from the front wall surface W1 sensed by the distance sensor 500 is longer than a distance between the first side wall 130 and the front wall surface W1, and shorter than a distance between the second side wall 140 and the front wall surface W1. However, the entirety of a front part of the suction nozzle 10 should touch the front wall in order to prevent the suction nozzle 10 from advancing forward by touching the front wall surface W1.

When the first rotary axis R1 is not parallel to the front wall surface W1, for example, when the second side wall 140 is located closer to the front wall surface W1 than the first side wall 130, the distance from the front wall surface W1 sensed by the distance sensor 500 is shorter than the distance between the first side wall 130 and the front wall surface W1, and shorter than the distance between the second side wall 140 and the front wall surface W1. However, even in this case, the entirety of the front part of the suction nozzle 10 should touch the front wall in order to prevent the suction nozzle 10 from advancing forward by touching the front wall surface W1.

In all directions faced by the suction nozzle 10, in order to comparatively accurately predict the movement time and the movement distance of the suction nozzle 10 until the advancing of the suction nozzle 10 by the front wall surface W1 is stopped, the distance sensor 500 may be located at an upper side of the center of the left-right direction of the suction nozzle 10.

Further, by considering this, the distance sensor 500 may be coupled to the upper side of the nozzle neck unit 200 at a point higher than the top of the nozzle head unit 100.

In order to install the distance sensor 500 in the suction nozzle 10, a case 520 and a PCB 510 to which the distance sensor 500 is fixed may be provided in the suction nozzle 10, and a small hole 221 through which electromagnetic energy (the visible ray, infrared, or radio wave) of the distance sensor 500 passes may be formed in the suction nozzle 10.

In an embodiment, the reference value is configured to be longer than a distance from the front end of the suction nozzle 10 up to the distance sensor 500. That is, before the front end of the suction nozzle 10 touches the wall surface W1, the distance sensor 500 senses the front wall surface W1, and further, the rotational speed of the first motor 31 by the control unit 38 is configured to increase.

The distance from the front end of the suction nozzle 10 up to the distance sensor 500 may be a distance in a range of 50 to 70 mm, and the reference value may be a distance in a range of 120 to 140 mm. In an embodiment, the distance from the front end of the suction nozzle 10 up to the distance sensor 500 may be approximately 65 mm and the reference value may be 130 mm.

When the control unit 38 determines that the distance value sensed by the distance sensor 500 is equal to or less than the reference value, the control unit 38 may immediately increase the rotational speed of the first motor 31, and as a result, the suction force inside the cleaner body 30 may momentarily increase. However, since the first motor 31 is provided in the cleaner body 30, and the cleaner body 30 is connected to the suction nozzle 10 through a connection pipe 20, a predetermined time is required so as to transfer the increased suction force of the cleaner body 30 up to the suction nozzle 10 (the suction port 101 of the suction nozzle 10). In an embodiment, from a time when the rotational speed of the first motor 31 increases, the increased suction force of the cleaner body is transferred to the suction nozzle 10, so as the time required for increasing the suction force of the suction nozzle 10, approximately 0.23 s (sec) (a variation time of the suction force) may be required.

Meanwhile, when the normal vacuum cleaner is used, the movement speed of the suction nozzle 10 (a speed of the suction nozzle which is pushed by a user and moved) may be approximately 500 mm/s.

Therefore, when the variation time of the suction force of the suction nozzle 10 is 0.23 s and the movement speed of the suction nozzle 10 is 500 mm/s, the movement distance of the suction nozzle 10 becomes 115 mm until the variation (increase) of the suction force is completed.

In this case, as described above, when the reference value is 130 mm, the suction force of the suction nozzle 10 may increase just before the front end of the suction nozzle 10 touches the front wall surface, and the foreign substances may be sucked by the increased suction force in the suction nozzle 10.

When the suction nozzle 10 is reversed and spaced apart from the front wall surface W1, the distance sensor 500 may sense the reverse of the suction nozzle 10, and in this case, the control unit 38 may decrease the rotational speed of the first motor 31 again.

In an embodiment, a rotational speed of the second motor 470 is configured to increase when a distance value sensed by the distance sensor 500 is equal to or less than a reference value. When the front wall is sensed by the distance sensor 500, the control unit 38 increases the rotational speed of the first motor 31 to increase the suction force at the suction port 101, and further, increases the rotational speed of the second motor 470 to increase the rotational speed of the rotating cleaner 400.

When the rotational speed of the rotating cleaner 400 increases, the foreign substances may be more rapidly moved through the first flow path 430, and uniform cleaning may be more rapidly performed in an entire region of the first space A1 in the second direction Y.

When the suction nozzle 10 is reversed and spaced apart from the front wall surface W1, the distance sensor 500 may sense the reverse of the suction nozzle 10, and in this case, the control unit 38 may decrease the rotational speed of the second motor 470 again.

FIGS. 19 to 22 are transverse cross-sectional views illustrating rotating cleaners 400 according to different embodiments, respectively.

Each fiber 421 constituting the fluffy 420 may be configured in a form to protrude in a radial direction on the outer peripheral surface of the core 410. As a result, the fluffy 420 may form a brush form surrounding the outer peripheral surface of the core 410.

In the embodiment of the present invention, the fiber 421 may be made of a natural fiber and/or an artificial fiber. The fiber 421 is configured in a form in which the length is larger than the diameter.

Respective fibers 421 constituting the fluffy 420 may be configured to have the same or similar diameter and length.

In the vacuum cleaner 1 according to the embodiment of the present invention, the fluffy 420 may be configured not to be wet with the water or configured not normally to be wet with the water. In the embodiment of the present invention, the fluffy 420 may be configured to have a 'water-resistant' property, a 'water repellent' property, or a 'waterproof' property.

To this end, the fluffy 420 may be configured as follows.

In an embodiment, the fiber 421 constituting the fluffy 420 may be configured to include a water-repellent agent or a waterproof agent, or configured to be coated with the water-repellent agent or the waterproof agent. In another embodiment, the fiber 421 constituting the fluffy 420 may be made of hydrophobicity plastic.

The water-repellent agent may be constituted by a fluorine-based water-repellent agent, a non-fluorine-based water-repellent agent, or a silicon-based water-repellent agent. The water-repellent agent may be constituted by an aqueous water-repellent agent or an oily water-repellent agent.

The water-repellent agent may be made of silicone alkoxide, aluminum alkoxide, zirconium alkoxide or titanium alkoxide.

The waterproof agent may be configured to include beeswax, wax, amayin oil, terrevin oil or castor oil, or may be made of a mixture thereof.

In an embodiment, when the fluffy 420 is configured by the combination of the fibers 421, each fiber 421 constituting the fluffy 420 may be coated with the water-repellent agent or the waterproof agent.

When the fluffy 420 is configured by the combination of the bristles, each bristle constituting the fluffy 420 may be coated with the water-repellent agent or the waterproof agent, when the fluffy 420 is configured by the combination of the threads, each thread constituting the fluffy 420 may be coated with the water-repellent agent or the waterproof agent, the fluffy 420 is configured by the combination of the cords, each cord constituting the fluffy 420 may be coated with the water-repellent agent or the waterproof agent, the fluffy 420 is configured by the combination of the filaments, each filament constituting the fluffy 420 may be coated with the water-repellent agent or the waterproof agent, or the fluffy 420 is configured by the combination of the pins, each pin constituting the fluffy 420 may be coated with the water-repellent agent or the waterproof agent.

When the fiber 421 constituting the fluffy 420 is coated with the water-repellent agent or the waterproof agent, so a coating layer 422 (the coating layer formed by the water-repellent agent or the waterproof agent) is formed at an exterior of each fiber 421.

The coating layer 422 formed at the exterior of the fiber 421 prevents the water from seeping into the fiber 421, and prevents the water from seeping between the fibers 421.

In an embodiment, the fluffy 420 is made of a polyamide fiber, a polyester fiber or a polyacryl fiber, or a combination thereof.

In an embodiment, the fiber 421 constituting the fluffy 420 can be made of polypropylene (PP), polyethylene (PE), polyethylene terephthalate (PET), polybutylene terephthalate (PBT), nylon or silicone. In this case, the fiber 421 may be configured in a form such as the bristle. Each fiber 421 may be configured in a form to protrude straightly in the radial direction on the outer peripheral surface of the core 410. In addition, each fiber 421 may be configured to have a diameter of approximately 0.01 to 2 mm. The respective fibers 421 may be in close contact with each other or may be spaced apart from each other.

The fiber 421 constituting the fluffy 420 may be configured to have elasticity.

The fibers 421 constituting the fluffy 420 are configured to have the elasticity, so the shape of each fiber 421 may be well maintained, and the water is removed from the fluffy 420 to easily achieve dehydration.

When each fiber 421 constituting the fluffy 420 can be made of polypropylene (PP), polyethylene (PE), polyethylene terephthalate (PET), polybutylene terephthalate (PBT), nylon or silicone, each fiber 421 may be configured to have a diameter of approximately 0.2 to 2 mm. When the fluffy 420 is configured to include the fibers 421, the fiber 421 of the fluffy 420 may have the elasticity, and when the external force is applied to the fluffy 420, the fibers 421 may be bent, and when the applied external force is removed, the fibers 421 may be elastically restored to an original state. Further, in this case, the water is not seeped into the fiber 421, and the fiber 421 has waterproofness.

As a result, the fluffy 420 is not well stained with the water, and the water may be prevented from being adsorbed into the fluffy 420 of the rotating cleaner 400, and even when the fluffy is stained with the water, the water may be effectively removed.

In an embodiment, the fluffy 420 may be configured to include the antimicrobial agent. Each fiber 421 constituting the fluffy 420 may be configured to include the antimicrobial agent.

In the embodiment of the present invention, an inorganic antimicrobial agent may be used.

The antimicrobial agent may be configured to include a metallic component having an antiviral function. For example, the antimicrobial agent may be configured to include gold, silver, platinum, copper, zinc, lead, tin, bismuth, cadmium, chromium, mercury, nickel and/or cobalt.

The antimicrobial agent may be configured to include calcium powder.

The antimicrobial agent may be configured to include zeolite, calcium phosphate or phosphate girconium. The antimicrobial agent may be made of guanidine compounds.

In a manufacturing process of the fiber constituting the fluffy, the antimicrobial agent may be included in each fiber, and manufactured.

The antimicrobial agent may be coupled to the brush by using an adhesive resin.

The fluffy 420 and the fiber 421 constituting the fluffy 420 are configured to include the antimicrobial agent to effectively prevent the bacteria from being proliferated in the fluffy 420.

In an embodiment, the fluffy 420 may be divided into an internal layer 420c and an external layer 420d.

The internal layer 420c is a layer which located relatively inside in the fluffy 420. The internal layer 420c is a layer coupled to the core 410.

The external layer 420d is a layer which located relatively outside in the fluffy 420. The external layer 420d is extended from the internal layer 420c to constitute the surface of the brush.

In an embodiment, the thickness of the internal layer 420c may be configured to be similar to the thickness of the external layer 420d, and in another embodiment, the thickness of the internal layer 420c may be configured to be thicker than the thickness of the external layer 420d. A ratio of the thickness of the internal layer 420c and the thickness of the external layer 420d may be configured to 1:1, 2:1, 3:1, 4:1, or 5:1.

In the vacuum cleaner 1 according to the embodiment of the present invention, the internal layer 420c of the fluffy 420 may be configured to have the waterproofness, water-repellency, and/or antimicrobiality. For example, the internal layer 420c of the fluffy 420 may be coated with the water-repellent agent or the waterproof agent, and the internal layer 420c of the fluffy 420 may be made of a hydrophobic plastic fiber 421, and the internal layer 420c of the fluffy 420 may be configured to include the antimicrobial agent.

When the internal layer 420c of the fluffy 420 is coated with the water-repellent agent or the waterproof agent, the external layer 420d of the fluffy 420 may not be coated with the water-repellent agent or the waterproof agent. That is, only the fiber 421 in the internal layer 420c in the fluffy 420 may be configured to have the water-repellency or water-proofness, or the fiber 421 constituting the internal layer 420c may be configured to have more excellent water-repellency or waterproofness than the fiber 421 constituting the external layer 420d.

In an embodiment, a coating layer 422 may be formed in the fiber 421 constituting the internal layer 420c of the fluffy 420, and the coating layer 322 may not be formed in the fiber 321 constituting the external layer 420d of the fluffy 420.

When the fluffy 420 is stained with the water and the water is absorbed in the fluffy 420 in the process of washing the fluffy 420 with the water or during the cleaning, the water may move to the external layer 420d rather than the internal layer 420c. Since the water which moves to the external layer 420d in the fluffy 420 may be easily evaporated outside or dehydrated, the water stained in the fluffy 420 may be easily removed.

Further, when the vacuum cleaner 1 is operated, the centrifugal force may be applied to the fluffy 420 by rotation of the rotating cleaner 400, and the water stained in the external layer 420d may be effectively removed by the centrifugal force.

When the fluffy 420 is stained with the water, the water moves to the external layer 420d rather than the internal layer 420c to effectively remove the water, prevent the bacteria from being proliferated inside the fluffy 420 (the internal layer 420c), and prevent the fluffy 420 from being deformed due to the water.

In an embodiment, each fiber 421 constituting of the fluffy 420 may be configured so that the diameter decreases toward the apex. As a result, when the fluffy 420 is stained with the water, the water may easily move to the outer peripheral surface of the fluffy 420. Since the water which moves to the outer peripheral surface in the fluffy 420 may be easily evaporated outside or dehydrated, the water stained in the fluffy 420 may be easily removed.

Further, when the vacuum cleaner 1 is operated, the centrifugal force may be applied to the fluffy 420 by the rotation of the rotating cleaner 400, and the water stained in the outer peripheral surface of the rotating cleaner 400 may be effectively removed by the centrifugal force.

FIG. 23*a* is a diagram illustrating the rotating cleaner 400 according to an embodiment and FIG. 23*b* is a transverse cross-sectional view illustrating the rotating cleaner 400 of FIG. 23.

In an embodiment, the rotating cleaner 400 may be further include a dehydration flow path 450.

The dehydration flow path 450 may be configured in the concave groove form on the outer peripheral surface of the fluffy 420. The dehydration flow path 450 forms a passage through the water stained in the fluffy 420 moves.

A plurality of dehydration flow paths 450 may be provided in the fluffy 420. The respective dehydration flow paths 450 may be configured to be spaced apart from each other, or configured to be parallel to each other. The dehydration flow paths 450 may be repeatedly provided in the circumferential direction of the rotating cleaner 400.

The dehydration flow path 450 is formed in a direction which crosses the first flow path 430. In an embodiment, the dehydration flow path 450 may be configured to be parallel to the direction of the first rotary axis R1.

In the vacuum cleaner 1 according to the embodiment of the present invention, the dehydration flow path 450 may be configured not to be connected to the first flow path 430.

A width d11 of the dehydration flow path 450 may be configured to be larger than the diameter of the fiber 421 constituting the fluffy 320 and smaller than the width of the first flow path 430.

When the fluffy 420 is stained with the water, an adsorption force of the water in the dehydration flow path 430 is lower than that of the water in other parts of the fluffy 420, so the water may be easily dehydrated and evaporated, and the water may be easily removed throughout the entirety of the rotating cleaner 400.

As such, the water stained in the fluffy 420 may be effectively removed through the dehydration flow path 450, and in this case, since the first flow path 430 and the dehydration flow path 450 are not connected to each other, the suction force transferred through the first flow path 430 is not distributed to the hydration flow path 450.

Hereinabove, a specific embodiment of the present invention is described and illustrated, but the present invention is not limited to the disclosed embodiment, and it may be appreciated by those skilled in the art that the embodiment can be variously modified and transformed to another specific embodiment without departing from the spirit and the scope of the present invention. Therefore, the scope of the present invention will not be defined by the described embodiment, but defined by the technical spirit disclosed in the claims.

INDUSTRIAL APPLICABILITY

The industrial applicability is remarkable in that in the vacuum cleaner according to the embodiment of the present invention, If the suction nozzle comes into contact with a wall surface and is unable to move forward, the front space of the suction nozzle can communicate with the suction port via the first flow path, and thus foreign materials such as dust can be effectively sucked in from the edge of the wall surface.

The invention claimed is:

1. A vacuum cleaner comprising:
a suction nozzle comprising (i) a nozzle head that defines a suction port at a bottom of the nozzle head and (ii) a rotary cleaner coupled to the nozzle head and configured to rotate about a first rotary axis extending in a left-right direction, the rotary cleaner defining a front side of the suction nozzle and be disposed forward relative to the suction port; and
a cleaner body connected to the suction nozzle, the cleaner body comprising a first motor configured to generate suction force for introducing air through the suction port,
wherein the rotary cleaner comprises:
a cylindrical core that extends along the first rotary axis,
a contact portion comprising at least one of a brush or a textile, the contact portion being coupled to an outer peripheral surface of the cylindrical core and configured to contact a surface to be cleaned, and
a first flow path that is defined in the contact portion and extends in an inclined direction with respect to the first rotary axis, the first flow path defining a single line or curve along the outer peripheral surface of the cylindrical core,
wherein the first flow path exposes a first portion of the outer peripheral surface of the cylindrical core, and the contact portion covers a second portion of the outer peripheral surface of the cylindrical core, and
wherein the first flow path is a single groove that is provided in the rotary cleaner and that extends substantially one revolution around the rotary cleaner such that a direction of the suction force applied to foreign substances in the first flow path switches as the rotary cleaner rotates.

2. The vacuum cleaner of claim 1, wherein the first flow path comprises:
a first boundary surface that defines a first boundary between the first flow path and the contact portion; and
a second boundary surface that defines a second boundary between the first flow path and the contact portion, the second boundary surface facing the first boundary surface, and
wherein the first boundary surface and the second boundary surface extend radially outward from the outer peripheral surface of the cylindrical core, wherein the first boundary surface has a first height from the outer peripheral surface of the cylindrical core, and
wherein an interval between the first boundary surface and the second boundary surface is greater than three times of the first height and less than four times of the first height.

3. The vacuum cleaner of claim 1, wherein an outer diameter of the cylindrical core is 35 to 40 mm, and an axial length of the cylindrical core is 210 to 230 mm, and
wherein a width of the first flow path is 15 to 25 mm, and a depth of the first flow path is 3 to 7 mm, and
wherein the first flow path defines a spiral shape, and a width and a depth of the first flow path are constant.

4. The vacuum cleaner of claim 1, wherein the first flow path comprises:
a first boundary surface that defines a first boundary between the first flow path and the contact portion, the first boundary surface having a spiral shape; and a second boundary surface that defines a second boundary between the first flow path and the contact portion, the second boundary surface having the spiral shape and extending along the first boundary surface, wherein the second boundary surface is disposed behind relative to the first boundary surface based on a rotational direction of the rotary cleaner, wherein each of the first boundary surface and the second boundary surface has (i) a front end facing a first side of the rotary cleaner and (ii) a rear end facing a second side of the rotary cleaner spaced apart from the first side in the left-right direction, wherein the first boundary surface defines a first normal plane that is orthogonal to the outer peripheral surface of the cylindrical core and disposed at the front end of the first boundary surface, wherein the second boundary surface defines a second normal plane that is orthogonal to the outer peripheral surface and disposed at the rear end of the second boundary surface, and wherein an angle between the first normal plane and the second normal plane is 0 to 45.

5. The vacuum cleaner of claim 1, wherein the first flow path comprises:

a first boundary surface that defines a first boundary between the first flow path and the contact portion, the first boundary surface having a spiral shape; and a second boundary surface that defines a second boundary between the first flow path and the contact portion, the second boundary surface having the spiral shape and extending along the first boundary surface, wherein the second boundary surface is disposed behind relative to the first boundary surface based on a rotational direction of the rotary cleaner, and wherein the first boundary surface comprises (i) a first front end portion that defines a front end of the first boundary surface facing a first side of the rotary cleaner and (ii) a first rear end portion that defines a rear end of the first boundary surface facing a second side of the rotary cleaner spaced apart from the first side in the left-right direction, wherein the second boundary surface comprises (i) a second front end portion that defines a front end of the second boundary surface facing the first side of the rotary cleaner and (ii) a second rear end portion that defines a rear end of the second boundary surface facing the second side of the rotary cleaner, and wherein the first rotary axis is parallel to a reference line connecting the first front end portion to the second rear end portion.

6. The vacuum cleaner of claim 1, wherein the nozzle head comprises:

a first derivation flow path that extends from the suction port in a direction parallel to the first rotary axis; and a second derivation flow path that extends from the suction port in a direction opposite to the first derivation flow path, and wherein the rotary cleaner includes a rear region that is disposed below the first rotary axis and exposed to the suction port, the first derivation flow path, and the second derivation flow path.

7. The vacuum cleaner of claim 1, wherein the nozzle head comprises:

an upper housing that extends parallel to the first rotary axis, the upper housing comprising an upper cover that covers an upper side of the rotary cleaner;

a lower housing located at a lower side of the upper housing, the lower housing defining the suction port at a front end of a center region of the lower housing in the left-right direction;

a first side wall that covers a first side surface of the rotary cleaner and is coupled to the upper housing and the lower housing;

a second side wall that covers a second side surface of the rotary cleaner opposite to the first side surface, the second side wall being coupled to the upper housing and the lower housing; and an internal wall that extends parallel to the first rotary axis, the internal wall having (i) a rear portion in contact with the rotary cleaner, (ii) a top portion coupled to a bottom of the upper housing, and (iii) a bottom corner disposed above a lower end of the rotary cleaner, wherein a bottom end of the internal wall is disposed below the first rotary axis, and wherein a front end of the upper cover is located forward relative to the rotary cleaner and extends parallel to the first rotary axis.

8. The vacuum cleaner of claim 1, further comprising:

a distance sensor coupled to the suction nozzle and configured to sense a distance between the suction nozzle and a wall surface disposed outside the vacuum cleaner, wherein the first motor is configured to increase a rotational speed of the first motor based on the distance sensed by the distance sensor being less than or equal to a reference value.

9. The vacuum cleaner of claim 8, wherein the suction nozzle further comprises:

a connection neck that has a pipe shape and is connected to the cleaner body; and a nozzle neck that has a pipe shape and extends from the nozzle head to the connection neck, the nozzle neck being rotatably coupled to the connection neck about a second rotary axis that is different from the first rotary axis, and wherein the distance sensor is coupled to an upper portion of the nozzle neck and disposed above a top of the nozzle head.

10. The vacuum cleaner of claim 1, further comprising:

a second motor coupled to the suction nozzle and configured to rotate the rotary cleaner; and a distance sensor coupled to the suction nozzle and configured to sense a distance between the suction nozzle and an object located outside the vacuum cleaner, wherein the second motor is configured to increase a rotational speed of the second motor based on the distance sensed by the distance sensor being less than or equal to a reference value.

11. The vacuum cleaner of claim 1, wherein the contact portion comprises a fiber that provides the rotary cleaner with waterproofness, water-repellency, or antimicrobiality.

12. A vacuum cleaner comprising:

a suction nozzle comprising (i) a nozzle head that defines a suction port at a bottom of the nozzle head and (ii) a rotary cleaner coupled to the nozzle head and configured to rotate about a first rotary axis extending in a left-right direction, the rotary cleaner defining a front side of the suction nozzle and be disposed forward relative to the suction port; and a cleaner body configured to generate suction force for introducing air through the suction port, wherein the rotary cleaner comprises:

a cylindrical core that extends along the first rotary axis, a contact portion comprising fibers that provide the rotary cleaner with waterproofness, water-repellency, or antimicrobiality, the contact portion being coupled to an outer peripheral surface of the cylindrical core, and a first flow path defined in the contact portion, and wherein the first flow path is a single groove that is provided in the rotary cleaner and that extends substantially one revolution around the rotary cleaner such that a direction of the suction force applied to foreign substances in the first flow path switches as the rotary cleaner rotates.

13. The vacuum cleaner of claim 12, wherein the fibers are coated with a water-repellent or a waterproof agent.

14. The vacuum cleaner of claim 12, wherein the fibers comprise a polyamide fiber, a polyester fiber, a polyacryl fiber, or any combination thereof.

15. The vacuum cleaner of claim 12, wherein the fibers are made of polypropylene (PP), polyethylene (PE), polyethylene terephthalate (PET), polybutylene terephthalate (PBT), nylon, or silicone.

16. The vacuum cleaner of claim 12, wherein the contact portion comprises an antimicrobial agent.

17. The vacuum cleaner of claim 12, wherein the contact portion comprises:

an internal layer coupled to the cylindrical core; and an external layer that extends outward relative to the internal layer and defines an external surface of the rotary cleaner, and wherein the internal layer provides the waterproofness, the water-repellency, or the antimicrobiality.

18. The vacuum cleaner of claim 12, wherein each of the fibers has an apex facing outward from the rotary cleaner, and wherein a diameter of each of the fibers decreases toward the apex thereof.

19. The vacuum cleaner of claim 12, wherein the rotary cleaner defines a plurality of dehydration flow paths that include a plurality of grooves defined in the contact portion, the plurality of dehydration flow paths being separate from the first flow path, and wherein a width of each of the plurality of dehydration flow paths is less than a width of the first flow path and greater than a diameter of one of the fibers.

20. The vacuum cleaner of claim 12, wherein the first flow path defines a spiral shape, wherein the first flow path exposes a first portion of the outer peripheral surface of the cylindrical core, and the contact portion covers a second portion of the outer peripheral surface of the cylindrical core, and wherein the first flow path defines a single line or curve along the outer peripheral surface of the cylindrical core.

* * * * *